US009143921B2

(12) United States Patent
Hu et al.

(10) Patent No.: US 9,143,921 B2
(45) Date of Patent: Sep. 22, 2015

(54) COMMUNICATING PHYSICAL LAYER WIRELESS PARAMETERS OVER AN APPLICATION PROGRAMMING INTERFACE

(71) Applicant: QUALCOMM Incorporated, San Diego, CA (US)

(72) Inventors: Jun Hu, San Diego, CA (US); Donna Ghosh, San Diego, CA (US); Rashid Ahmed Akbar Attar, San Diego, CA (US); Jing Sun, San Diego, CA (US); Peter P. Ang, San Diego, CA (US); Ravindra Mahendrakumar Garach, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/019,843

(22) Filed: Sep. 6, 2013

(65) Prior Publication Data
US 2015/0072667 A1 Mar. 12, 2015

(51) Int. Cl.
H04M 3/00 (2006.01)
H04W 8/18 (2009.01)

(52) U.S. Cl.
CPC .................................. H04W 8/183 (2013.01)

(58) Field of Classification Search
CPC ..... H04W 8/245; H04W 72/04; H04W 52/02; H04W 52/0229; H04W 52/0216; H04W 52/0245; H04L 2012/5607; H04L 29/08672; H04L 45/00; G06F 8/65; G10L 19/008; G10L 19/00; G10L 21/04
USPC ........ 455/418, 432.2, 450–452.2, 574, 552.1, 455/553.1, 343.2–343.5; 717/168–178; 370/229–235, 311, 310.2, 328, 322; 709/201, 223, 230–244; 704/500–504
See application file for complete search history.

(56) References Cited

U.S. PATENT DOCUMENTS

| 6,038,609 | A | 3/2000 | Geulen |
| 6,334,047 | B1 | 12/2001 | Andersson et al. |
| 7,263,333 | B2 * | 8/2007 | Roberts ...................... 455/67.13 |
| 7,787,892 | B2 | 8/2010 | Yang et al. |
| 8,121,585 | B2 | 2/2012 | Commarford et al. |
| 8,224,402 | B2 | 7/2012 | Sengupta et al. |

(Continued)

OTHER PUBLICATIONS

ISA/EPO, International Search Report and Written Opinion of the International Searching Authority, Int'l. App. No. PCT/US2014/052887, Nov. 25, 2014, European Patent Office, Rijswijk, NL, 10 pgs.

(Continued)

Primary Examiner — Steve D Agosta
(74) Attorney, Agent, or Firm — Holland & Hart LLP

(57) ABSTRACT

Methods, systems, and devices are described for communicating physical layer wireless parameters over an application programming interface. A wireless modem of a wireless device may measure at least one physical layer wireless parameter. The wireless modem may report the at least one physical layer wireless parameter to an application running on the wireless device over an application programming interface between the wireless modem and the application. A behavior of the application may be adapted to control wireless communications between the application and a network based on the at least one physical layer wireless parameter reported by the wireless modem. Other aspects, embodiments, and features are also claimed and described.

12 Claims, 17 Drawing Sheets

(56) References Cited

U.S. PATENT DOCUMENTS

| | | |
|---|---|---|
| 8,885,533 B2 | 11/2014 | Fang et al. |
| 2002/0071395 A1 | 6/2002 | Redi et al. |
| 2004/0203722 A1 | 10/2004 | Lassers et al. |
| 2006/0045117 A1 | 3/2006 | Qi et al. |
| 2006/0270385 A1 | 11/2006 | Morris |
| 2007/0058669 A1 | 3/2007 | Hoffmann et al. |
| 2009/0156269 A1 | 6/2009 | Harris et al. |
| 2010/0014459 A1 | 1/2010 | Mir et al. |
| 2011/0080868 A1 | 4/2011 | Krishnaswamy et al. |
| 2011/0151884 A1 | 6/2011 | Zhao |
| 2012/0128045 A1 | 5/2012 | Ling et al. |
| 2012/0129564 A1 | 5/2012 | De La Cropte De Chanterac |
| 2012/0207098 A1 | 8/2012 | Cooley et al. |
| 2014/0201556 A1 | 7/2014 | Attar |

OTHER PUBLICATIONS

IPEA/EPO, Second Written Opinion of the International Preliminary Examining Authority, Int'l. App. No. PCT/US2014/052887, Jul. 10, 2014, European Patent Office, Munich, DE, 7 pgs.

\* cited by examiner

COMMUNICATING PHYSICAL LAYER WIRELESS PARAMETERS OVER AN APPLICATION PROGRAMMING INTERFACE

TECHNICAL FIELD

The technology discussed below relates generally to wireless communication, and more specifically to adapting wireless device application behavior to changing network conditions.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple wireless devices. Base stations may communicate with wireless devices on downstream and upstream links. Each base station has a coverage range, which may be referred to as the coverage area of the cell. In cellular networks, both uplink and downlink channel conditions can vary unpredictably over time. These fluctuations may be influenced by channel fades, shadowing changes, sector load changes, interference, transmitter power, scheduler dynamics, and other factors. Such fluctuations may detrimentally affect the rate at which data can be transmitted over the channels.

Wireless device applications often rely on data transmitted to and from cellular networks, and changing channel conditions may affect the operations of the applications. While wireless device applications may implement different techniques to compensate for reduced rates of data transmission, often a wireless device application is unaware of deteriorating channel conditions until after the user experience of the mobile application has suffered. Thus, there is an ongoing need in the art to provide solutions for applications to quickly and efficiently obtain information about wireless channel conditions.

BRIEF SUMMARY OF SOME EXAMPLES

The described features generally relate to one or more improved systems, methods, and/or apparatuses for communicating wireless physical layer parameters between a wireless modem of a wireless device and an application running on the wireless device. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

According to at least a first illustrative set of embodiments, a method of managing a wireless device may include measuring at least one physical layer wireless parameter at a wireless modem of the wireless device, reporting the at least one physical layer wireless parameter from the wireless modem to an application running on the wireless device over an application programming interface between the wireless modem and the application, and adapting a behavior of the application to control wireless communications between the application and a network based on the at least one physical layer wireless parameter reported by the wireless modem.

In certain examples, a request from a client component of the application may be received at a server running on the wireless modem over the application programming interface. The request may identify the at least one physical layer wireless parameter. The at least one physical layer wireless parameter may be transmitted over the application programming interface in response to the request.

In certain examples, the reporting may include receiving at least one standing request for the at least one physical layer wireless parameter from the application over the application programming interface; and reporting, at each of a plurality of periodic reporting intervals while the wireless modem is in a connected state, the at least one physical layer wireless parameter to the application based on the at least one standing request.

In certain examples, the reporting may include reporting the at least one physical layer wireless parameter to the application over the application programming interface during each of a plurality of scheduled wakeups while the wireless modem is in an idle state. A different set of physical layer wireless parameters may be reported to the application during the idle state of the wireless modem than during an connected state of the wireless modem. In certain examples, the at least one physical layer wireless parameter may be mapped into one of a plurality of predetermined categories, and the reporting may include transmitting the predetermined category to the application over the application programming interface.

In certain examples, the at least one physical layer wireless parameter may include one or more of: a cost of modem power associated with transmitting data from the wireless modem, an uplink data rate, a downlink data rate, a network loading parameter, a maximum multimedia rate, an uplink buffer size of the wireless modem, a pilot signal strength, or a device reachability.

In certain examples, adapting the behavior of the application may include one or more of: dynamically modifying a usage of Domain Name Server (DNS) prefetches by the wireless device, dynamically modifying a format of data requested by the application from the network, dynamically modifying a download of a background update for the application, dynamically modifying a compression used to stream data between the application and the network, or dynamically selecting a radio access technology used for the wireless communications between the application and the network.

In certain examples, a battery status of the wireless device may be reported to the application over the application programming interface in connection with the at least one physical layer wireless parameter, and the adapting of the behavior of the application may be further based on the battery status of the wireless device.

According to a second set of illustrative embodiments, a wireless device may include at least one processor and a memory communicatively coupled with the at least one processor. The at least one processor may be configured to execute an application stored on the memory to measure at least one physical layer wireless parameter at a wireless modem of the wireless device; report the at least one physical layer wireless parameter from the wireless modem to the application running on the wireless device over an application programming interface between the wireless modem and the application; and adapt a behavior of the application to control wireless communications between the application and a network based on the at least one physical layer wireless parameter reported by the wireless modem.

In certain examples, the at least one processor executing the application may be further configured to implement one or more aspects of the method of the first illustrative set of embodiments.

According to a third set of illustrative embodiments, a wireless device may include means for measuring at least one physical layer wireless parameter at a wireless modem of the wireless device, means for reporting the at least one physical layer wireless parameter from the wireless modem to the application running on the wireless device over an application programming interface between the wireless modem and the application, and means for adapting a behavior of the application to control wireless communications between the application and a network based on the at least one physical layer wireless parameter reported by the wireless modem.

In certain examples, the wireless device may include means for implementing one or more aspects of the method of the first illustrative set of embodiments.

According to a fourth set of illustrative embodiments, a computer program product may include a non-transitory computer-readable medium. The computer-readable medium may include computer-readable code that, when executed by at least one processor, causes the at least one processor to measure at least one physical layer wireless parameter at a wireless modem of the wireless device, report the at least one physical layer wireless parameter from the wireless modem to an application running on the wireless device over an application programming interface between the wireless modem and the application; and adapt a behavior of the application to control wireless communications between the application and a network based on the at least one physical layer wireless parameter reported by the wireless modem.

In certain examples, the computer-readable code may, when executed by the at least one processor, cause the at least one processor to implement one or more aspects of the method of the first illustrative set of embodiments.

According to a fifth set of illustrative embodiments, a method of managing a wireless device may include requesting at least one physical layer wireless parameter from a wireless modem of the wireless device over an application programming interface between an application running on the wireless device and the wireless modem, the at least one physical layer wireless parameter comprising information associated with an air interface between the wireless device and at least one base station; receiving the at least one physical layer wireless parameter from the wireless modem over the application programming interface; determining a modification to wireless communications between the application and a network based on the received at least one physical layer wireless parameter from the wireless modem; and communicating with the network using the wireless modem according to the determined modification.

In certain examples, at least one standing request for the at least one physical layer wireless parameter may be transmitted to the wireless modem over the application programming interface. A report of the at least one physical layer wireless parameter may be received from the wireless modem over the application programming interface at each of a plurality of periodic reporting intervals while the wireless modem is in a connected state.

In certain examples, a report of the at least one physical layer wireless parameter may be received from the wireless modem over the application programming interface during each of a plurality of scheduled wakeups while the wireless modem is in an idle state.

In certain examples, the at least one physical layer wireless parameter may include one or more of: a cost of modem power associated with transmitting data from the wireless modem, an uplink data rate, a downlink data rate, a network loading parameter, a maximum multimedia rate, an uplink buffer size, a pilot signal strength, or a device reachability.

In certain examples, the modification to wireless communications between the application and the network may include a modification to one or more of: a usage of Domain Name Server (DNS) prefetches by the wireless device, a format of data requested by the application from the network, a download of a background update for the application, a compression used to stream data between the application and the network, or a radio access technology used for the wireless communications between the application and the network.

In certain examples, a battery status of the wireless device may be received over the application programming interface in connection with the at least one physical layer wireless parameter, and the modification to the wireless communications may be further based on the battery status of the wireless device.

According to a sixth set of illustrative embodiments, a wireless device may include at least one processor and a memory communicatively coupled with the at least one processor. The at least one processor may be configured to execute an application stored on the memory to request at least one physical layer wireless parameter from a wireless modem of the wireless device over an application programming interface between the application running on the wireless device and the wireless modem, the at least one physical layer wireless parameter comprising information associated with an air interface between the wireless device and at least one base station; receive the at least one physical layer wireless parameter from the wireless modem over the application programming interface; determine a modification to wireless communications between the application and a network based on the received air link information from the wireless modem; and communicate with the network using the wireless modem according to the determined modification.

In certain examples, the at least one processor executing the application may be further configured to implement one or more aspects of the method of the fifth illustrative set of embodiments.

According to at least a seventh set of illustrative embodiments, a wireless device may include means for requesting at least one physical layer wireless parameter from a wireless modem of the wireless device over an application programming interface between an application running on the wireless device and the wireless modem, the at least one physical layer wireless parameter comprising information associated with an air interface between the wireless device and at least one base station; means for receiving the at least one physical layer wireless parameter from the wireless modem over the application programming interface; means for determining a modification to wireless communications between the application and a network based on the received at least one physical layer wireless parameter from the wireless modem; and means for communicating with the network using the wireless modem according to the determined modification.

In certain examples, the wireless device may include means for implementing one or more aspects of the method of the fifth illustrative set of embodiments.

According to at least an eighth set of illustrative embodiments, a computer program product may include a computer program product may include a non-transitory computer-readable medium. The computer-readable medium may include computer-readable code that, when executed by at least one processor, causes the at least one processor to request at least one physical layer wireless parameter from a wireless modem of the wireless device over an application programming interface between the application running on the wireless device and the wireless modem, the at least one physical layer wireless parameter comprising information associated with an air interface between the wireless device and at least one base station; receive the at least one physical layer wireless parameter from the wireless modem over the application programming interface; determine a modification to wireless communications between the application and a network based on the received air link information from the wireless modem; and communicate with the network using the wireless modem according to the determined modification.

In certain examples, computer-readable code may, when executed by the at least one processor, cause the at least one processor to implement one or more aspects of the method of the fifth illustrative set of embodiments.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, the various embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
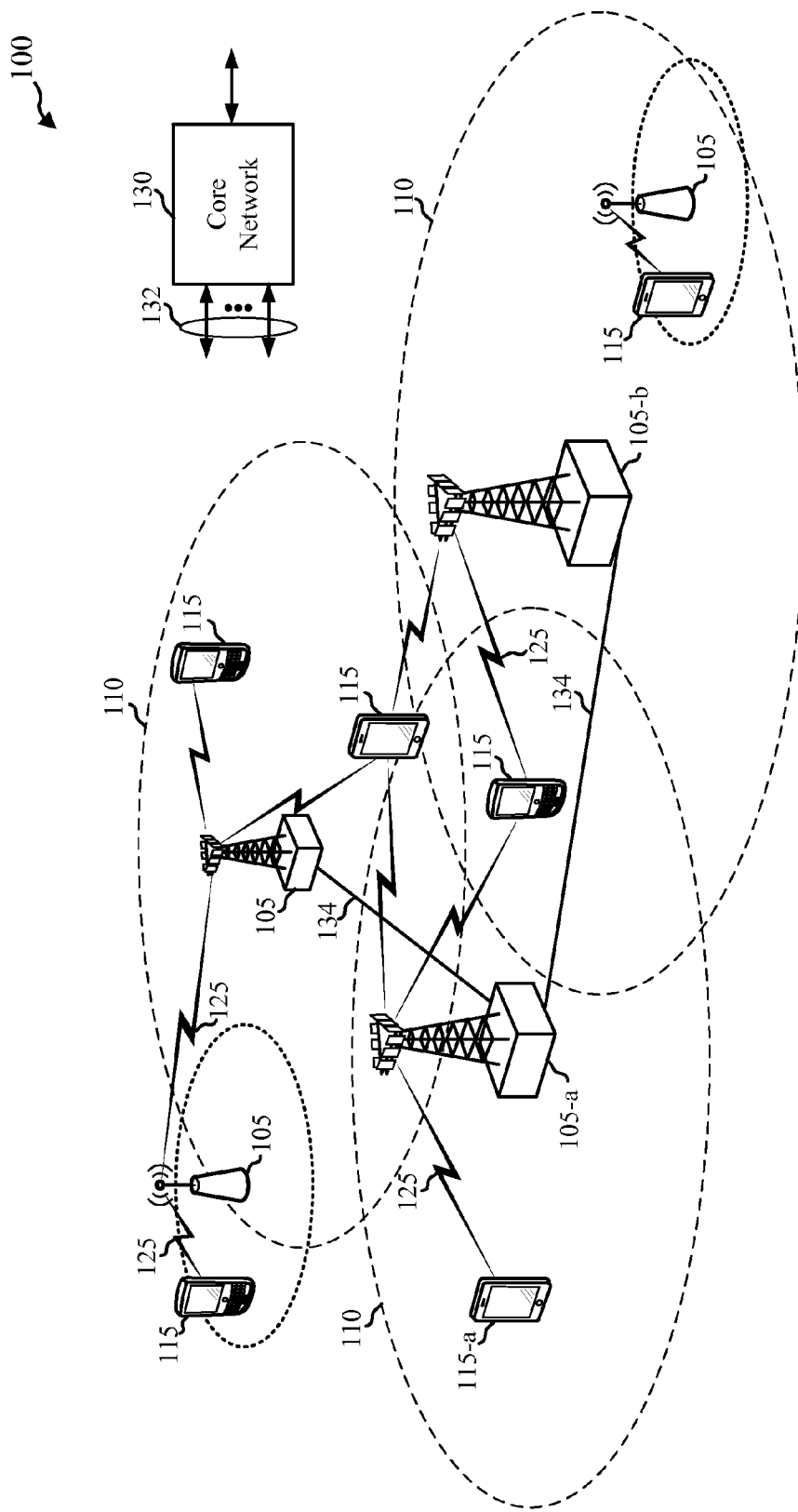
FIG. 1 shows a block diagram of an example of a wireless communications system according to some embodiments.

The present description is directed to techniques for managing of the measurement and reporting of physical layer wireless parameters (e.g., cost of modem power, buffer size, network loading, channel rate, pilot signal strength, device reachability, etc.) in a wireless device. An application programming interface (API) may be established between a wireless modem of a wireless device and an application running on the wireless device. The API may allow the application to communicate directly with the wireless device at the application layer to receive physical layer wireless parameters measured and reported by the wireless modem.

The behavior of the application may then be adapted to control wireless communications between the application and a network based on the physical layer wireless parameters reported by the wireless modem. In particular, the behavior of the application with respect to the wireless communications may be adapted in response to and/or to compensate for a measured degradation in channel quality reflected in the physical layer wireless parameters reported by the wireless modem. In certain examples, the behavior of the application may be adapted by modifying one or more of: the usage of Domain Name Server (DNS) prefetches by the application, the format of data requested by the application from the network (e.g., mobile version of web page instead of full web page), the download of background updates for the application, the compression used to stream data between the application and the network, or a radio access technology (RAT) used for the wireless communications between the application and the network.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 shows a block diagram of an example of a wireless communications system 100 according to principles described herein. The wireless communications system 100 includes base stations (or cells) 105, wireless devices 115, and a core network 130. The base stations 105 may communicate with the wireless devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the wireless devices 115 via one or more base station antennas. Each of the base stations 105 sites may provide communication coverage for a respective coverage area 110. In some embodiments, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include base stations 105 of different types (e.g., macro, micro, and/or pico base stations). There may be overlapping coverage areas for different technologies.

In embodiments, the wireless communications system 100 is an LTE/LTE-A network communication system. In LTE/LTE-A network communication systems, the terms evolved Node B (eNodeB) may be generally used to describe the base stations 105. The wireless communications system 100 may be a Heterogeneous LTE/LTE-A network in which different types of eNodeBs provide coverage for various geographical regions. For example, each eNodeB 105 may provide communication coverage for a macro cell, a pico cell, a femto cell, and/or other types of cell. A macro cell generally covers a relatively large coverage area (e.g., several kilometers in radius) and may allow unrestricted access by UEs 115 with service subscriptions with the network provider. A pico cell would generally cover a relatively smaller coverage area (e.g., buildings) and may allow unrestricted access by UEs 115 with service subscriptions with the network provider. A femto cell would also generally cover a relatively small coverage area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells.

The core network 130 may communicate with the base stations 105 via a backhaul link 132 (e.g., S1 interface, etc.). The base stations 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The wireless devices 115 may be dispersed throughout the wireless communications system 100, and each wireless device 115 may be stationary or mobile. A wireless device 115 may also be referred to by those skilled in the art as a UE, mobile station, a subscriber station, a mobile unit, a subscriber unit, a wireless unit, a remote unit, a wireless device, a wireless communications device, a remote device, a mobile subscriber station, an access terminal, a mobile terminal, a wireless terminal, a remote terminal, a handset, a user agent, a mobile client, a client, or some other suitable terminology.

A wireless device 115 may be a cellular phone, a personal digital assistant (PDA), a wireless modem, a wireless communication device, a handheld device, a tablet computer, a laptop computer, a cordless phone, a wireless local loop (WLL) station, or the like.

The communication links 125 shown in the wireless communications system 100 may include uplink (UL) transmissions from a wireless device 115 to a base station 105, and/or downlink (DL) transmissions, from a base station 105 to a wireless device 115. The downlink transmissions may also be called forward link transmissions while the uplink transmissions may also be called reverse link transmissions.

As discussed above, downlink and uplink channel rates can vary unpredictably over time for a number of reasons. Examples of factors that may affect the downlink or uplink channel rate between a wireless device 115 and a base station 105 may include channel fades, shadowing changes, sector load changes, interference, transmitter power fluctuations, uplink scheduling dynamics, and other factors. Real-time applications, such as video chat applications, mobile gaming applications, adaptive streaming (DASH) applications, web browsing applications, and the like may face the challenge of adapting the behavior of the application to the network conditions to provide an acceptable user experience. For example, a video chat application streaming data to and from the internet via a cellular base station 105 may encode video at a compression rate that matches channel conditions. If the compression rate is too high, playback of the video may be interrupted. On the other hand, if the compression rate is too low, the quality of the video may suffer. Many wireless device 115 applications do not have a way to directly access the current condition of the wireless communication channels of the wireless device 115. Thus, these applications may be unable to adapt their behavior to changing channel conditions quickly enough to prevent degradation in user experience or application performance.

To address these and other issues, the present description provides for an application programming interface (API) between the wireless modem of a wireless device 115 and an application running on the wireless device 115. The wireless modem of the wireless device 115 may provide one or more physical layer wireless parameters to the application over the API to facilitate application adaptation. The physical layer wireless parameters may be provided to the application in response to a standing or one-time request by the application. The wireless modem may report physical layer wireless parameters to the application when the wireless device 115 is in connected state or idle state. In certain examples, a different set of physical layer wireless parameters for the wireless modem may be available when the wireless device 115 is in connected state than is available when the wireless device 115 is in idle state.

Figure 2:
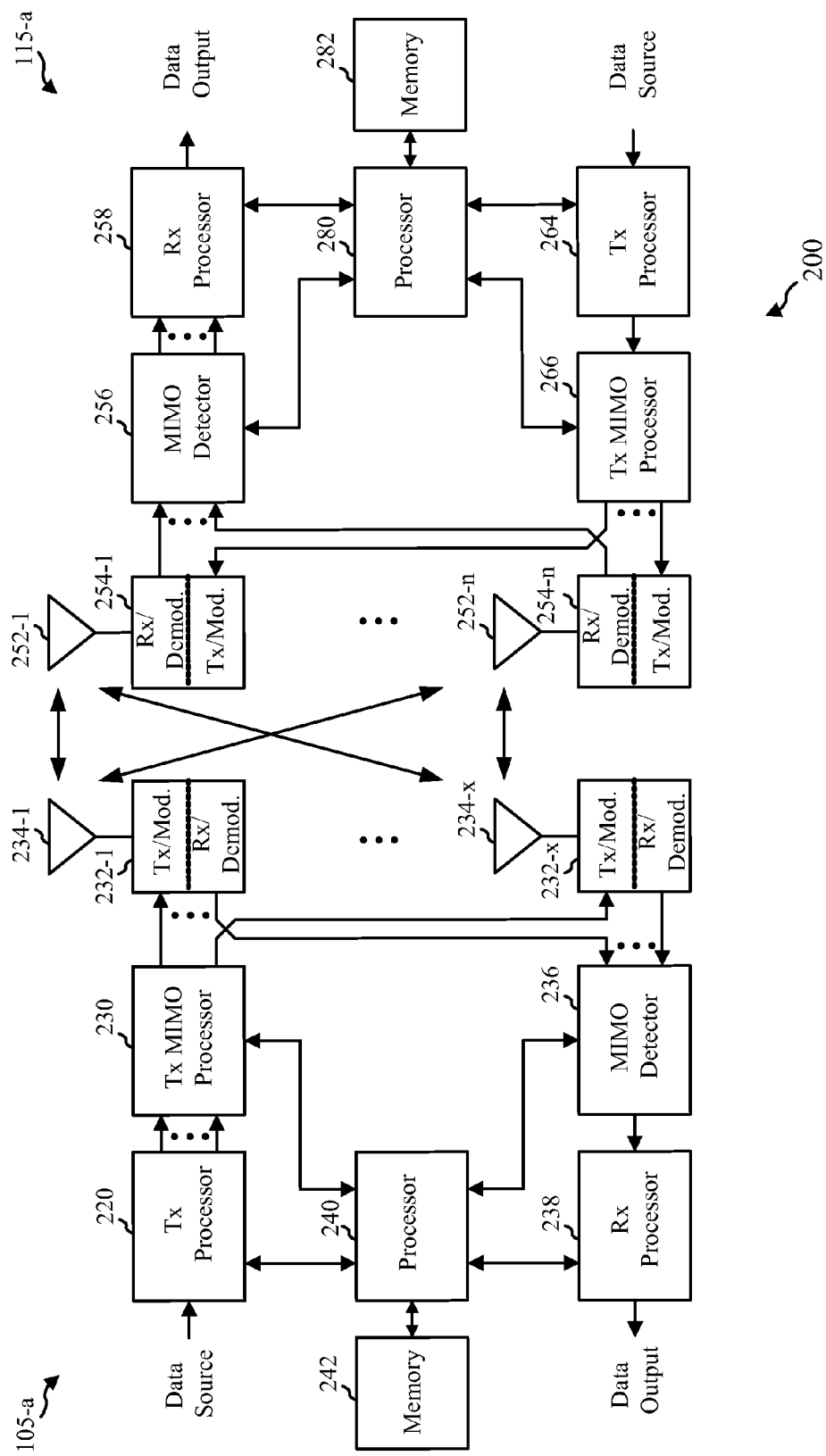
FIG. 2 shows a block diagram of an example of a wireless communications system according to some embodiments.

FIG. 2 shows a block diagram of an example of a wireless communications system 200 according to principles described herein. The wireless communications system 200 may include a wireless device 115-a and a base station 105-a. This wireless communications system 200 may illustrate aspects of the wireless communications system 100 of FIG. 1. For example, the base station 105-a may be an example of one or more of the base stations 105 described above with respect to FIG. 1, and the wireless device 115-a may be an example of one or more of the wireless devices 115 described above with respect to FIG. 1.

The base station 105-a may be equipped with base station antennas 234-1 through 234-x, where x is a positive integer, and the wireless device 115-a may be equipped with wireless device antennas 252-1 through 252-n. In the wireless communications system 200, the base station 105-a may be able to send data over multiple communication links at the same time. Each communication link may be called a "layer" and the "rank" of the communication link may indicate the number of layers used for communication. For example, in a 2×2 MIMO system where base station 105-a transmits two "layers," the rank of the communication link between the base station 105-a and the wireless device 115-a is two.

At the base station 105-a, a base station transmit processor 220 may receive data from a base station data source and control information from a base station controller/processor 240 communicatively coupled with base station memory 242. The base station transmit processor 220 may process (e.g., encode and symbol map) the data and control information to obtain data symbols and control symbols, respectively. The base station transmit processor 220 may also generate reference symbols, e.g., for a primary sounding signal (PSS), secondary sounding signal (SSS), and cell-specific reference signal. A base station transmit (TX) MIMO processor 230 may perform spatial processing (e.g., precoding) on data symbols, control symbols, and/or reference symbols, if applicable, and may provide output symbol streams to the base station modulators/demodulators 232-1 through 232-x. Each of the base station modulators/demodulators 232 may process a respective output symbol stream (e.g., for OFDM, etc.) to obtain an output sample stream. Each base station modulator/demodulator 232 may further process (e.g., convert to analog, amplify, filter, and upconvert) the output sample stream to obtain a downlink (DL) signal. In one example, DL signals from base station modulators/demodulators 232-1 through 232-x may be transmitted via the base station antennas 234-1 through 234-x, respectively.

At the wireless device 115-a, the wireless device antennas 252-1 through 252-n may receive the DL signals from the base station 105-a and may provide the received signals to the wireless device modulators/demodulators 254-1 through 254-n, respectively. Each of the wireless device modulators/demodulators 254 may condition (e.g., filter, amplify, downconvert, and digitize) a respective received signal to obtain input samples. Each of the wireless device modulators/demodulators 254 may further process the input samples (e.g., for OFDM, etc.) to obtain received symbols. A wireless device MIMO detector 256 may obtain received symbols from all the wireless device modulators/demodulators 254-1 through 254-n, perform MIMO detection on the received symbols if applicable, and provide detected symbols. A wireless device receiver (Rx) processor 258 may process (e.g., demodulate, deinterleave, and decode) the detected symbols, providing decoded data for the wireless device 115-a to a data output, and provide decoded control information to a wireless device controller/processor 280, or wireless device memory 282.

On the uplink (UL), at the wireless device 115-a, a wireless device transmit processor 264 may receive and process data from a wireless device data source. The wireless device transmit processor 264 may also generate reference symbols for a reference signal. The symbols from the wireless device transmit processor 264 may be precoded by a wireless device transmit MIMO processor 266 if applicable, further processed by the wireless device modulators/demodulators 254-1 through 254-n (e.g., for SC-FDMA, etc.), and be transmitted to the base station 105-a in accordance with the transmission parameters received from the base station 105-a. At the base station 105-a, the UL signals from the wireless device 115-a may be received by the base station antennas 234, processed by the base station modulators/demodulators 232, detected by a base station MIMO detector 236 if applicable, and further processed by a base station receiver processor 238. The base station receiver processor 238 may provide decoded data to a base station data output and to the base station controller/processor 240. The components of the wireless device 115-*a* may, individually or collectively, be implemented with one or more Application Specific Integrated Circuits (ASICs) adapted to perform some or all of the applicable functions in hardware. Each of the noted modules may be a means for performing one or more functions related to operation of the wireless communications system 200. Similarly, the components of the base station 105-*a* may, individually or collectively, be implemented with one or more Application Specific Integrated Circuits (ASICs) adapted to perform some or all of the applicable functions in hardware. Each of the noted components may be a means for performing one or more functions related to operation of the wireless communications system 200.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. At the Physical layer, the transport channels may be mapped to Physical channels.

In one configuration, the wireless device transmit processor 264, the wireless device receiver processor 258, the wireless device MIMO detector 256, the wireless device Tx MIMO processor 266, and the wireless device modulators/demodulators 254 may be components of a wireless device wireless modem. Additionally, the wireless device controller/processor 280 may be configured to execute code stored on the wireless device memory 282 to run one or more wireless device applications.

In one aspect of such a configuration, the wireless device 115-*a* may include means for measuring at least one physical layer wireless parameter at the wireless modem, means for reporting the at least one physical layer wireless parameter from the wireless modem to an application running on the wireless device over an application programming interface (API) between the wireless modem and the application, and means for adapting a behavior of the application to control wireless communications between the application and a network based on the at least one physical layer wireless parameter reported by the wireless modem.

In another aspect of such a configuration, the wireless device 115-*a* may include means for requesting at least one physical layer wireless parameter from the wireless modem of the wireless device 115-*a* over an application programming interface between an application running on the wireless device 115-*a* and the wireless modem, the at least one physical layer wireless parameter comprising air link information associated with a link between the wireless device 115-*a* and the base station 105-*a*, means for receiving the at least one physical layer wireless parameter from the wireless modem over the application programming interface, means for determining a modification to wireless communications between the application and a network based on the received at least one physical layer wireless parameter from the wireless modem, and means for communicating with the network using the wireless modem according to the determined modification.

The aforementioned means of both described aspects may be the wireless device controller/processor 280, the wireless device memory 282, the wireless device receiver processor 258, the wireless device MIMO detector 256, the wireless device transmit processor 264, the wireless device Tx MIMO processor 266, and the wireless device modulators/demodulators 254.

Figure 3:
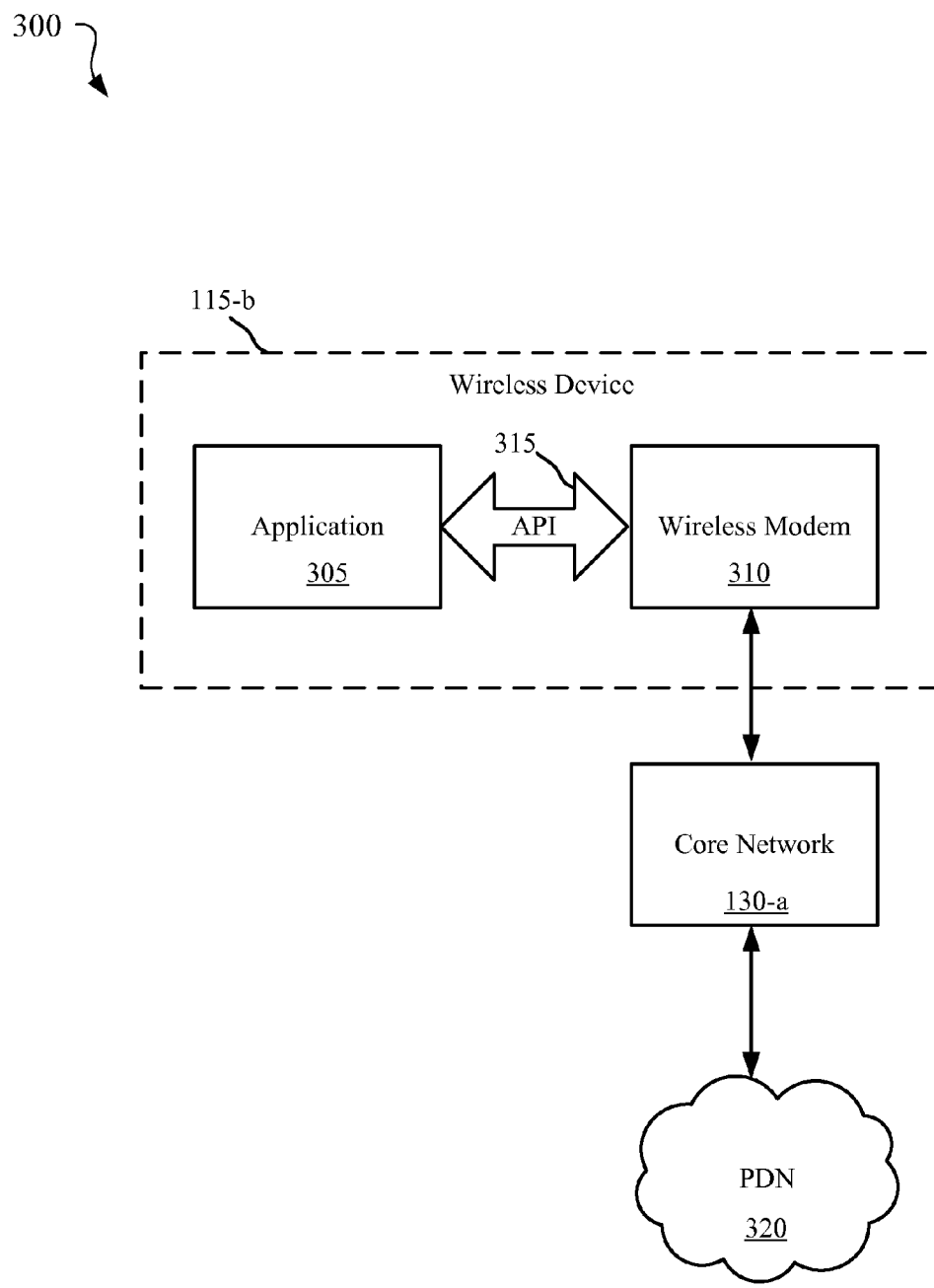
FIG. 3 shows a block diagram of an example of a wireless communications system according to some embodiments.

FIG. 3 shows a block diagram of an example of a wireless communications system 300 according to principles described herein. The wireless communications system 300 may include a wireless device 115-*b*, a core network 130-*a*, and a packet data network (PDN) 320, such as the internet. This wireless communications system 300 may illustrate aspects of one or more of the wireless communications systems 100, 200 described above with reference to the previous Figures. For example, the wireless device 115-*b* may be an example of one or more of the wireless devices 115 described above with respect to FIGS. 1-2.

In the present example, the wireless device 115-*b* may include a wireless modem 310 communicatively coupled with an application 305 running on the wireless device 115-*b*. The wireless modem 310 and the application 305 may communicate with each other at the application layer through an application programming interface (API) 315. The API 315 may define a library of routines, data structures, object classes, and variables for communications between the wireless modem 310 and the application 305. Specifically, the API 315 may define a series of calls between the wireless modem 310 and the application 305 to request and transport physical layer wireless parameters measured by the wireless modem 310. Additionally, the API 315 may define a series of call to provide a battery status of the wireless device 115-*b* to the application 305. The physical layer wireless parameters may be related to condition associated with an air interface between the wireless modem 310 and the core network 130-*a* which may affect the connectivity or data rate between the wireless modem 310 and the core network 130-*a* and, by extension, the PDN 320.

In certain examples, the API 315 may be implemented over a client-server architecture in which the wireless modem 310 runs a server component while each application 305 of the wireless device 115-*c* runs a client component. The client-server architecture may be implemented within the Qualcomm Mobile station modem (MSM) Interface (QMI) framework or another API 315.

The physical layer wireless parameters received from the wireless modem 310 over the API 315 may affect the behavior of the application 305 with respect to wireless communications between the application 305 and the PDN 320. For example, the API 315 may provide useful air interface information to the application 305 that can be used by the application to inform the application 305 of network conditions. For example, the API 315 may allow the application 305 to request and receive one or more of the following physical layer wireless parameters from the wireless modem 310: a cost of modem power parameter, a downlink data rate parameter, an uplink data rate parameter, an uplink buffer size parameter, a maximum multimedia rate (e.g., a maximum video codec rate), a network loading parameter, a pilot signal strength parameter, and/or a device reachability parameter. In certain examples, the application 305 may also request and receive a battery status of the wireless device 115-*b* over the API 315. The battery status of the wireless device 115-*b* may be reported to the application 305 by the wireless modem 310 and/or another entity.

The physical layer wireless parameter(s) received over the API 315 and/or the battery status of the wireless device 115-*b* may allow the application 305 to control its network communications to achieve a better user experience. For example, the application 305 adapt its behavior based on one or more of the physical layer wireless parameters and/or battery status parameters received from the wireless modem 310 over the API 315 by modifying one or more of: a usage of Domain Name Server (DNS) prefetches by the application 305, a format of data requested by the application 305 from the PDN 320, a download of a background update for the application 305 from the PDN 320, a compression used to stream data between the application 305 and the PDN 320, or a radio access technology used for the wireless communications between the application 305 and the core network 130-a.

In certain examples, the wireless device 115-b may be capable of supporting multiple radio access technologies (RATs). The API 315 inputs and outputs for requesting physical layer wireless parameters may remain the same across all RATs to provide a consistent interface to the application 305. In a multi-mode wireless device 115-b capable of communicating over multiple RATs concurrently, the wireless modem 310 may make the decision of which RAT metrics to report in response to receiving a request for a physical layer wireless parameter from the application 305. Additionally or alternatively, the application 305 may also request and receive RAT-specific physical layer wireless parameters over the API 315.

Figure 4:
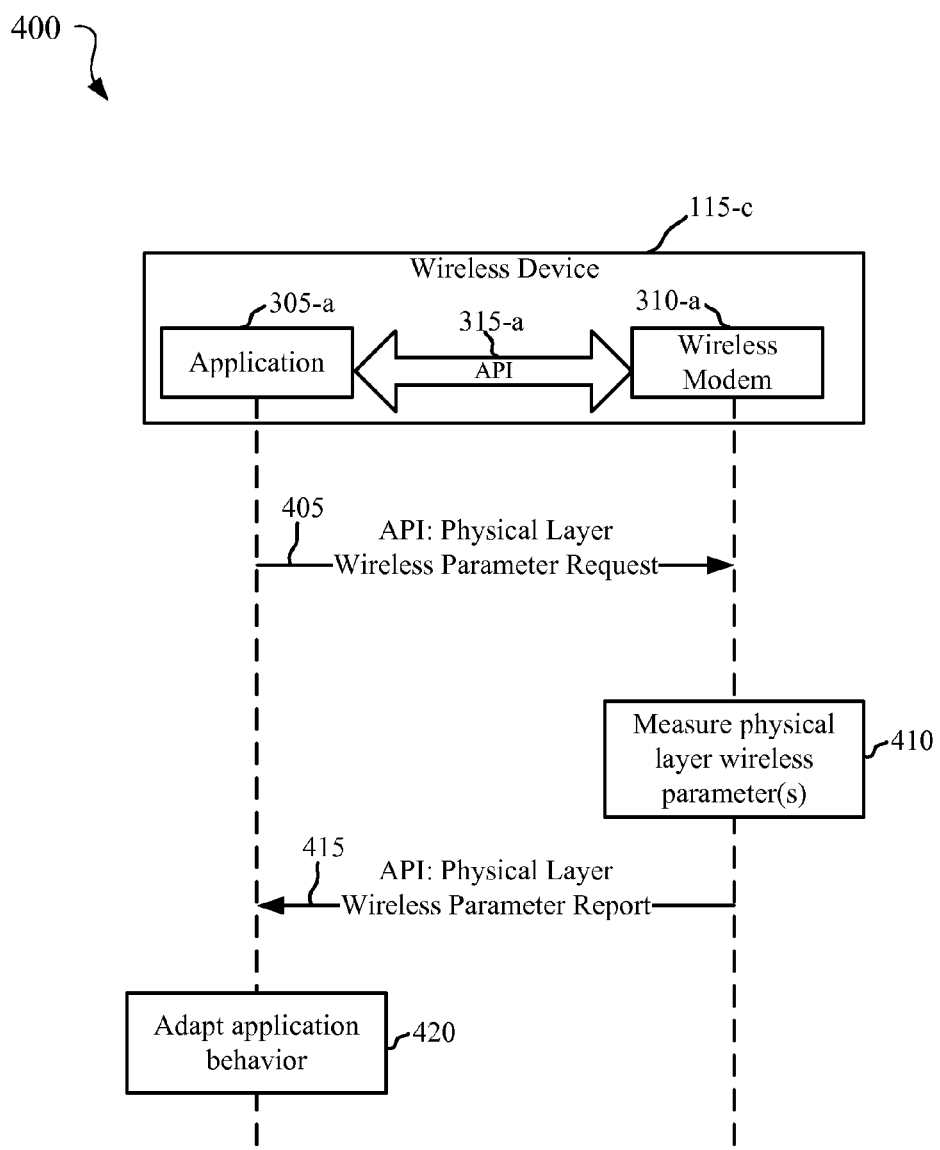
FIG. 4 shows a block diagram of an example of a call flow between an application and a wireless modem of a wireless device according to some embodiments.

FIG. 4 shows a block diagram of an example of a call flow 400 between an application 305-a and a wireless modem 310-a of a wireless device 115-c according to principles described herein. The wireless device 115-c may illustrate aspects of one or more of the wireless devices 115 described above with reference to the previous Figures. For example, the wireless device 115-c may be a component of one or more of the wireless communications systems 100, 200, 300 described above with reference to the previous Figures.

The application 305-a and the wireless modem 310-a of the wireless device 115-c may communicate with each other over an API 315-a, as discussed in FIG. 3. In the present example, the application 305-a may transmit a physical layer wireless parameter request message 405 to the wireless modem 310-a over the API 315-a. The physical layer wireless parameter request message 405 may specify one or more of the physical layer wireless parameters measured by the wireless modem 310-a. In certain examples, the physical layer wireless parameter request message 405 may signal a standing request for the indicated physical layer wireless parameter(s). The standing request may opt the application 305-a into a subscription to regular reports of the indicated physical layer wireless parameter(s) over the API 315-a. Alternatively, the physical layer wireless parameter request message 405 may signal a one-time request for the indicated physical layer wireless parameter(s).

At block 410, the wireless modem 310-a may measure the physical layer wireless parameter(s) indicated in the physical layer wireless parameter request message 405. In certain examples, this measurement may occur in response to the physical layer wireless parameter request message 405. Additionally or alternatively, the wireless modem 310-a may measure the indicated physical layer wireless parameter(s) prior to receiving the physical layer wireless parameter request message 405. The wireless modem 310-a may respond to the physical layer wireless parameter request message 405 by transmitting a physical layer wireless parameter report message 415 over the API 315-a to the application 305-a. The physical layer wireless parameter report message 415 may include the physical layer wireless parameter(s) indicated in the physical layer wireless parameter request message 405, if available. In certain examples, the wireless modem 310-a may also transmit a battery status of the wireless device 115-c over the API 315-a to the application 305-a.

At block 420, the application 305-a may adapt its behavior with respect to network communications based on the one or more physical layer wireless parameters received in the physical layer wireless parameter report message 415 from the wireless modem 310-a. In certain examples, the behavior may be further adapted based on the battery status of the wireless device 115-c received over the API 315-a from the wireless modem 310-a. As noted above, this adaptation of the behavior of the application 305-a may include modifying one or more of: a usage of Domain Name Server (DNS) prefetches by the wireless device 115-c, a format of data requested by the application 305-a from the PDN 320, a download of a background update for the application 305-a from the PDN 320, a compression used to stream data between the application and the PDN 320, or a radio access technology used for the wireless communications between the application 305-a and the core network 130-a.

Figure 5:
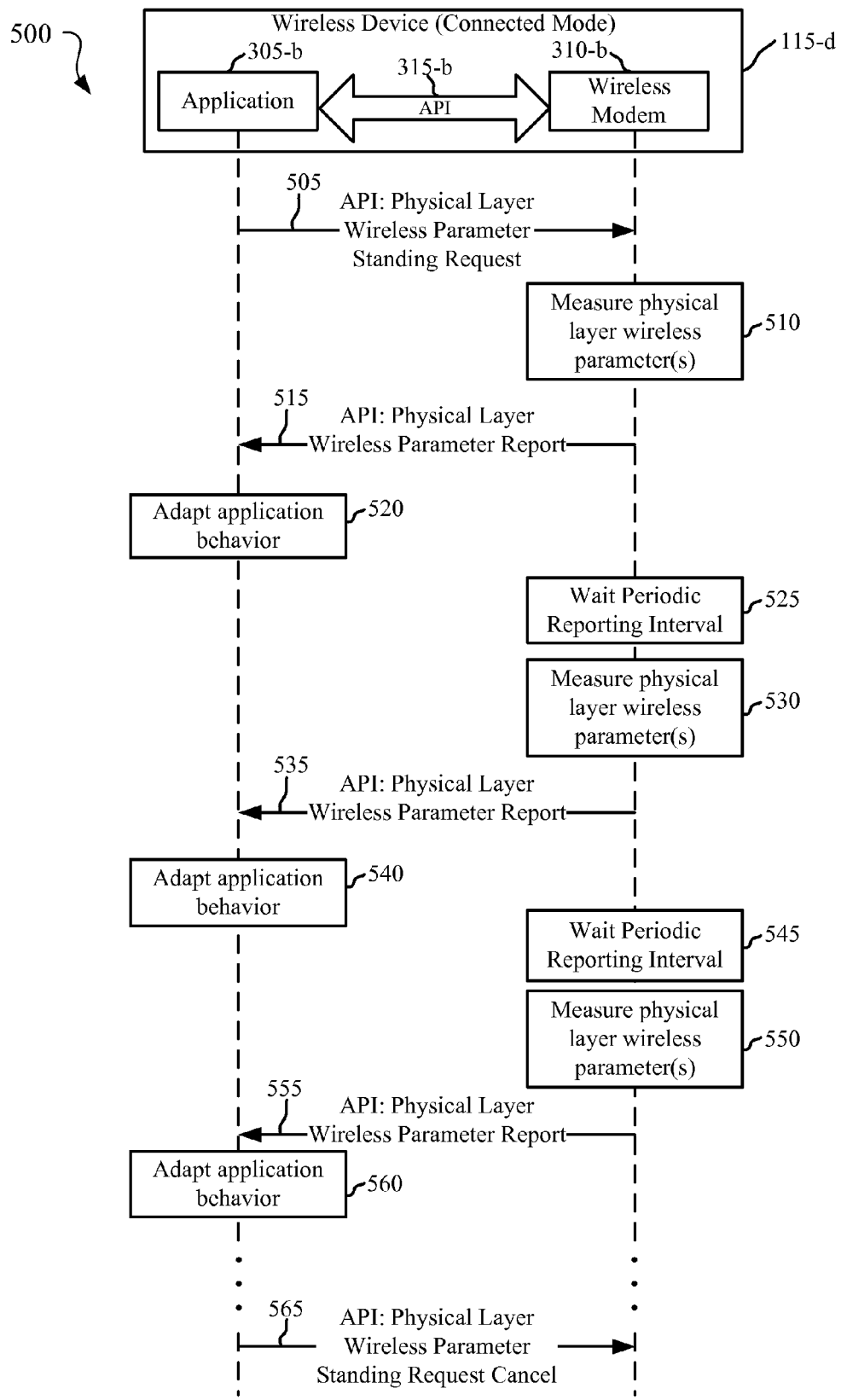
FIG. 5 shows a block diagram of an example of a call flow between an application and a wireless modem of a wireless device according to some embodiments.

FIG. 5 shows a block diagram of an example of a call flow 400 between an application 305-b and a wireless modem 310-b of a wireless device 115-d according to principles described herein. The wireless device 115-d may illustrate aspects of one or more of the wireless devices 115 described above with reference to the previous Figures. For example, the wireless device 115-d may be a component of one or more of the wireless communications systems 100, 200, 300 described above with reference to the previous Figures. The application 305-b and the wireless modem 310-b of the wireless device 115-d may communicate with each other over an API 315-b, as previously discussed.

The call flow 500 of FIG. 5 may illustrate an example of a process for reporting physical layer wireless parameters to the application 305-b over the API 315-b when the wireless device 115-d is in a connected state. As used herein and in the appended claims, the term "connected state" refers to a state of attachment to a base station with an active Radio Resource Control (RRC) connection.

The application 305-b may request physical layer wireless parameters from the wireless modem 310-b by transmitting a physical layer wireless parameter standing request message 505 to the wireless modem 310-b over the API 315-b. The physical layer wireless parameter standing request message 505 may subscribe the application 305-b to periodic reports by the wireless modem 310-c of the one or more physical layer wireless parameters identified in the physical layer wireless parameter standing request message 505.

At block 510, the wireless modem 310-b may measure the indicated physical layer wireless parameter(s). The wireless modem may then transmit the measured physical layer wireless parameter(s) to the application 305-b over the API 315-b in a physical layer wireless parameter report message 515. In certain examples, a battery status of the wireless device 115-d may be transmitted to the application 305-b over the API 315-b in the physical layer wireless parameter report message 515 or in a separate message. Based on the measured physical layer wireless parameter(s) in the physical layer wireless parameter report message 515 and/or the battery status of the wireless device 115-d, the application 305-b may adapt its behavior at block 520 to control wireless communications between the application and a network as described above.

As long as the application 305-b remains subscribed to reports on the indicated physical layer wireless parameter(s) (e.g., as long as the application 305-b does not cancel the standing request), the wireless device 115-d may continue to periodically report the physical layer wireless parameter(s) to the application 305-b. Thus, in the example of FIG. 5, the wireless modem 310-b may wait a periodic reporting interval (e.g., 40 ms) at block 525, measure the indicated physical layer wireless parameters after the periodic reporting interval at block 530, and issue another physical layer wireless parameter report message 535 to the application 305-b with the updated measurements. In certain examples, different physical layer wireless parameters may be associated with different periodic reporting intervals. Alternatively, the same periodic reporting interval may be used for multiple physical layer wireless parameters. The application 305-b may adapt its behavior at block 540 to control wireless communications between the application 305-b and the network based on the updated measurements received over the API 315-b.

The wireless modem 310-b may then wait another periodic reporting interval at block 545, measure the indicated physical layer wireless parameters at block 550, transmit another physical layer wireless parameter report 555 to the application 305-b over the API 315-b, and the application 305-b may adapt its behavior at block 560 based on the updated measurements received over the API 315-b. This cycle of waiting, measuring, reporting, and adapting application behavior may continue until the application 305-b transmits a physical layer wireless parameter standing request cancel message 565 to cancel the standing request.

In certain examples, the wireless modem 310-b may support multiple applications 305-b concurrently, and different applications 305-b may have standing requests for the same physical layer wireless parameters. In such cases, the physical layer wireless parameter report messages from the wireless modem 310-b may be synchronized across the applications 305-b.

In some embodiments, the wireless modem 310-b may stop reporting the measurements of a physical layer wireless parameter when it has received a physical layer wireless parameter standing request cancel message 565 for that physical layer wireless parameter from all applications 305-b that had requested periodic reports of that physical layer wireless parameter. The wireless modem 310-b may continue measuring physical layer wireless parameters for which no standing request is active (e.g., at the same or a reduced frequency), or may stop measuring the physical layer wireless parameters entirely.

In certain examples, as an alternative to standing requests, the application 305-b may make a one-time query to the wireless modem 310-b over the API 315-b for a set of one or more physical layer wireless parameters. In response to the one-time query, the wireless modem 310-b may report new or saved measurements of the requested physical layer wireless parameter(s) to the application 305-b over the API 315-b.

Figure 6:
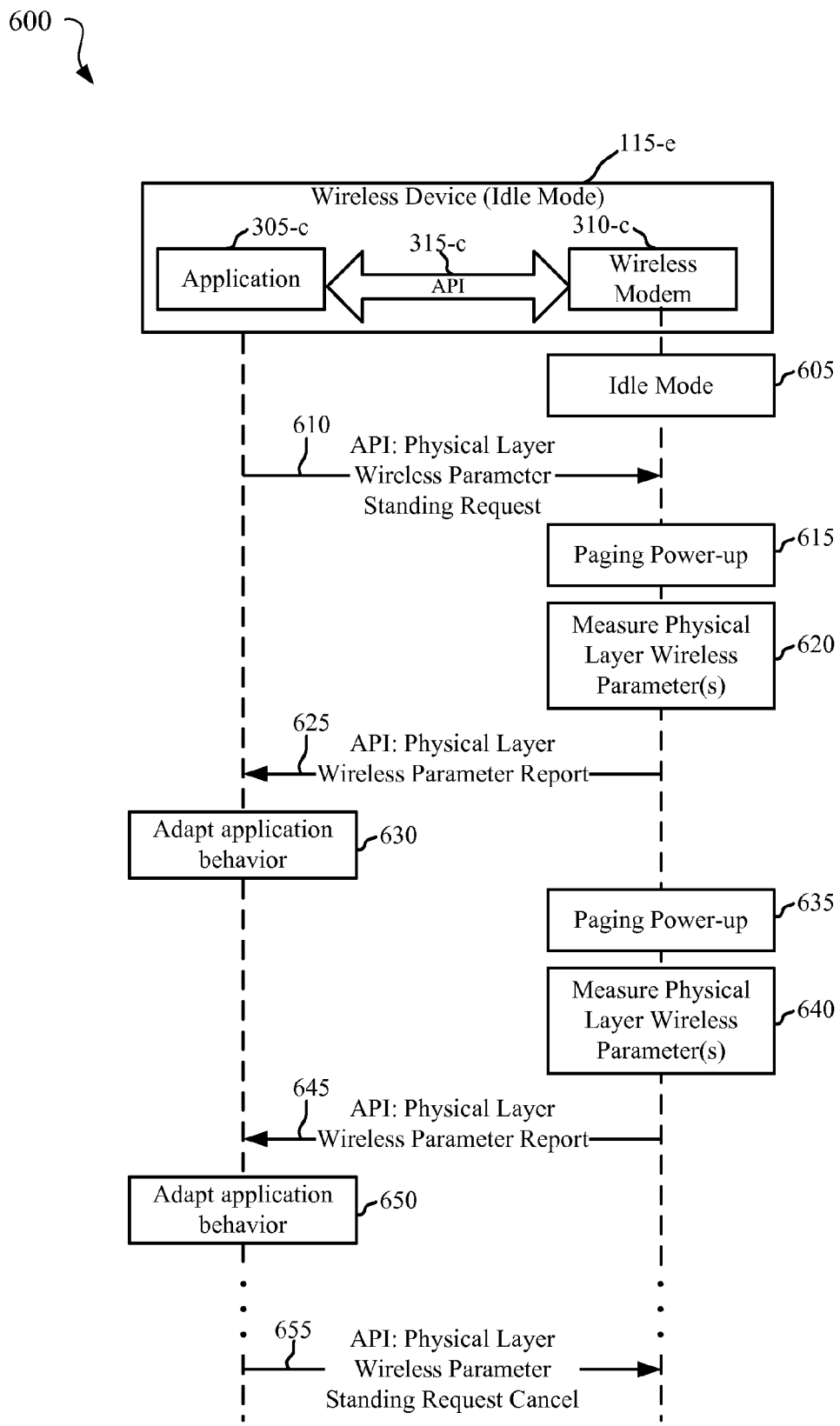
FIG. 6 shows a block diagram of an example of a call flow between an application and a wireless modem of a wireless device according to some embodiments.

FIG. 6 shows a block diagram of an example of a call flow 600 between an application 305-c and a wireless modem 310-c of a wireless device 115-e according to principles described herein. The wireless device 115-e may illustrate aspects of one or more of the wireless devices 115 described above with reference to the previous Figures. For example, the wireless device 115-e may be a component of one or more of the wireless communications systems 100, 200, 300 described above with reference to the previous Figures. The application 305-c and the wireless modem 310-c of the wireless device 115-e may communicate with each other over an API 315-c, as previously discussed.

The call flow 600 of FIG. 6 may illustrate an example of a process for reporting physical layer wireless parameters to the application 305-c over the API 315-c when the wireless device 115-e is in an idle state. As used herein and in the appended claims, the term "idle state" refers to a state in which the wireless device 115-e does not have an active Radio Resource Control (RRC) connection. In such cases, the periodicity of physical layer wireless parameter reports by the wireless modem 310-c may be tied to the frequency with which the wireless modem 310-c wakes up during the to check for pages.

Thus, in the example of FIG. 6, the wireless device 115-e may enter idle state at block 605. The application 305-c may transmit a physical layer wireless parameter standing request message 610 to the wireless modem 310-c over the API 315-c to request periodic reports for one or more physical layer wireless parameters. At block 615, the wireless modem 310-c may wake up to check for pages, at which point the wireless modem 310-c may perform measurements (block 620) for at least the physical layer wireless parameter(s) indicated in the physical layer wireless parameter standing request message 610. The wireless modem may report the measured physical layer wireless parameter(s) to the application 305-c over the API 315-c in a physical layer wireless parameter report message 625, and the application 305-c may use the reported physical layer wireless parameters to adapt its behavior (block 630) to control wireless communications between the application 305-c and a network. In certain examples, the wireless modem 310-c may transmit a battery status of the wireless device 115-e (e.g., with the physical layer wireless parameter report message 625), and the application 305-c may adapt its behavior further based on the battery status of the wireless device 115-e.

At block 635, the wireless modem 310-c may wake up again to check for pages, and at block 640 the measurements may be performed again while the wireless modem 310-c is powered up. The wireless modem 310-c may transmit the updated physical layer wireless parameters to the application 305-c over the API 315-c in a physical layer wireless parameter report message 645, and the application may again adapt its behavior at block 650 based on the updated physical layer wireless parameters. This cycle of reporting measurements when the wireless modem 310-c powers up to check for pages may continue until the application transmits a wireless parameter standing request cancel message 655 over the API 315-c or the wireless device transitions into a connected state.

While in the example of FIG. 6 the wireless modem 310-c measures and reports the indicated physical layer wireless parameters at each paging power-up, the periodicity of measurements and/or reports may be less frequent. For example, the wireless modem 310-c may measure and report the indicated physical layer wireless parameters every second or third time the wireless modem 310-c powers up to check for pages. In certain examples, the application 305-c may request a specific periodicity of reporting over the API 315-c (e.g., in the physical layer wireless parameter standing request message 610).

Figure 7:
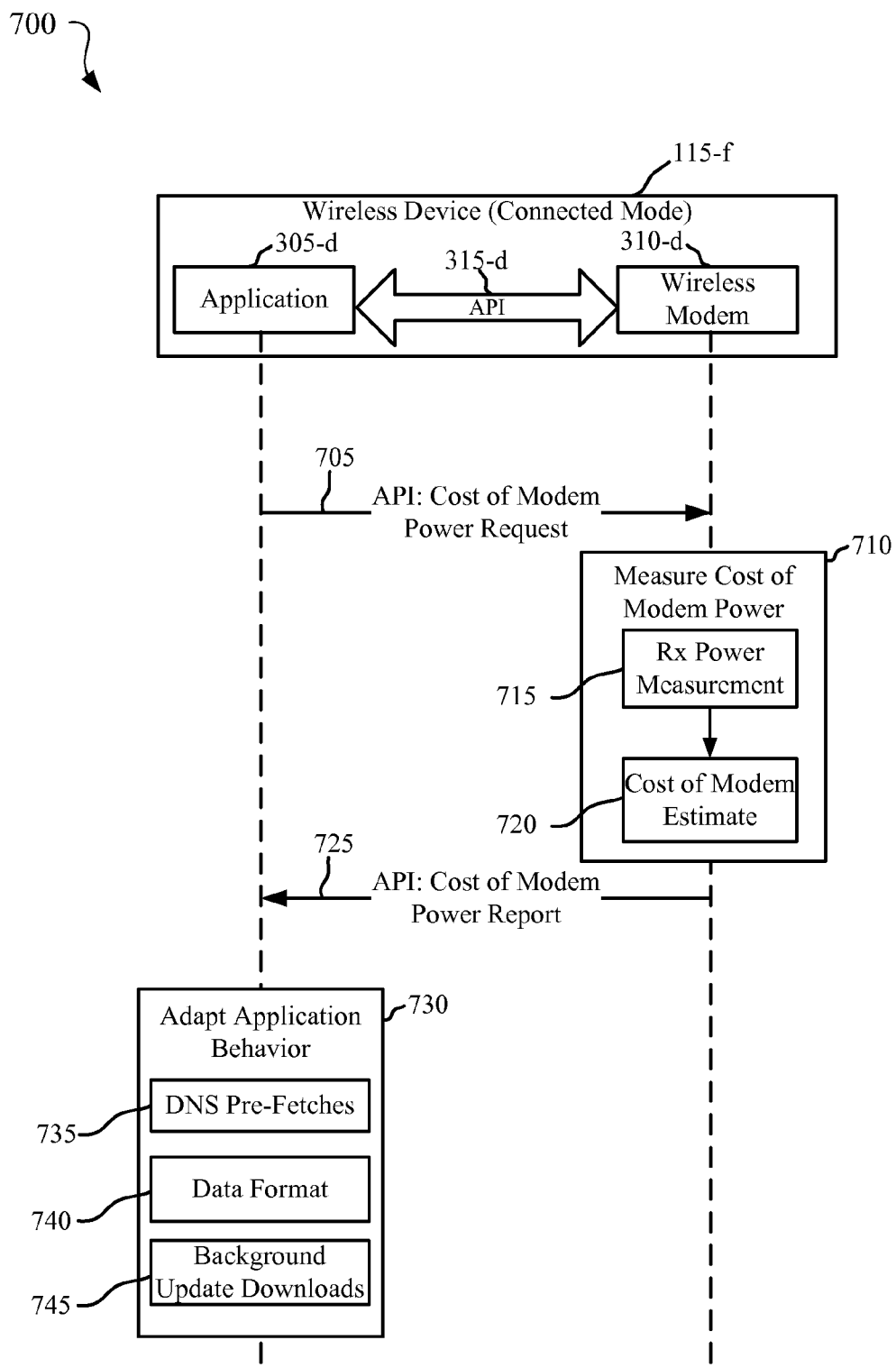
FIG. 7 shows a block diagram of an example of a call flow between an application and a wireless modem of a wireless device according to some embodiments.

FIG. 7 shows a block diagram of an example of a call flow 700 between an application 305-d and a wireless modem 310-d of a wireless device 115-f according to principles described herein. The wireless device 115-f may illustrate aspects of one or more of the wireless devices 115 described above with reference to the previous Figures. For example, the wireless device 115-f may be a component of one or more of the wireless communications systems 100, 200, 300 described above with reference to the previous Figures. The application 305-d and the wireless modem 310-d of the wireless device 115-f may communicate with each other over an API 315-d, as previously discussed.

The call flow 700 of FIG. 7 may illustrate an example of the application 305-d using a cost of modem power parameter received over the API 315-d from the wireless modem 310-d to adapt the behavior of the application 305-d and control wireless communications between the application 305-*d* and a network. The cost of modem power parameter may be an example of one or more of the physical layer wireless parameters described above with reference to the previous Figures. The cost of modem power parameter may indicate the relative power cost associated with transmitting wireless data from the application 305-*d* to the network over the wireless modem 310-*d* based on current network conditions.

The process may begin with the application 305-*d* transmitting a cost of modem power request message 705 to the wireless modem 310-*d* over the API 315-*d*. The cost of modem power request message 705 may be an example of one or more of the physical layer wireless parameter standing request messages described above with reference to FIGS. 4-6. Alternatively, the cost of modem power request message 705 may be a one-time request for the cost of modem power parameter.

At block 710, the wireless modem 310-*d* may measure the cost of modem power parameter. The process of measuring the cost of modem power parameter may vary depending on whether the wireless modem 310-*d* is in connected state or idle state.

In one example of a 1x EV-DO wireless modem 310-*d* in connected state, the wireless modem 310-*d* may measure the filtered transmit pilot power (FiltTxPilotPwr) used in reverse media access control (RMAC). The wireless modem 310-*d* may also estimate a linear overhead ($Ovhd_{lin}$) as:

$$Ovhd_{lin} = 1 + 10 \frac{RRIgain}{10} + 10 \frac{DRCgain}{10} 10 \frac{ACKgain}{10}$$

where RRIgain, DRCgain, and ACKgain are all standard defined parameters. Using the FiltTxPilotPwr and $Ovhd_{lin}$ parameters, the instantaneous total transmit power (FiltTxTotalPwr) may be calculated as:

$$FiltTxTotalPwr = 10 \frac{FiltTxPilotPwr}{10} * \left(1 + Ovhd_{lin} + 10 \wedge \left(\frac{T2P}{10}\right)\right)$$

where T2P is a predetermined traffic-to-pilot ratio. The FiltTxTotalPwr parameter may then be mapped to one of a discrete number of categories. For example, a FiltTxTotalPwr under 0 dBm may be classified as a "low" cost, a FiltTxTotalPwr between 0 and 10 dBm may be classified as a "medium" cost, and a FiltTxTotalPwr greater than 10 dBm may be classified as a "high" cost. In certain examples, this classification (e.g., the low, medium, or high classification) of the transmit power estimate may be the cost of modem power parameter returned to the application 305-*d* over the API 315-*d*. Additionally or alternatively, the cost of modem power parameter may include the computed FiltTxTotalPwr parameter.

In another example of a 1x EV-DO wireless modem 310-*d* in idle state, the wireless modem 310-*d* may generate the cost of modem power parameter each time the wireless modem 310-*d* wakes up to check for pages. During the wake up, a filtered receive power of the wireless modem 310-*d* may be measured (block 715), and the measured receive power may be used to estimate (block 720) the transmit power. For example, a transmit pilot power TxPilotPwr parameter may be calculated based on the open-loop equation. The linear overhead parameter $Ovhd_{lin}$ and filtered transmit total power FiltTxTotalPwr parameters may then be calculated as described above with respect to the connected state example.

As in the connected state example the value of the FiltTxTotalPwr parameter may be mapped to one of a discrete set of classifications (e.g., "low," "medium," or "high") and the classification may be the cost of modem power parameter returned to the application 305-*d*. Additionally or alternatively, the cost of modem power parameter returned to the application 305-*d* may include the calculated FiltTxTotalPwr parameter.

Once the wireless modem 310-*d* has determined the cost of modem power parameter, the wireless modem may transmit a cost of modem power report message 725 containing the cost of modem power parameter to the application 305-*d* over the API 315-*d*. The cost of modem power report message 725 may be an example of one or more of the physical layer wireless parameter reports described above with reference to FIGS. 4-6.

Upon receiving the cost of modem power parameter, the application 305-*d* may adapt its behavior (block 735) to control wireless communications between the application 305-*d* and the network based on the cost of modem power parameter. For example, the application 305-*d* may reduce or suspend its of use of DNS pre-fetches 735 over the network based on a determination that the cost of modem power parameter is greater than a predetermined threshold (e.g., greater than a "low" classification). Additionally or alternatively, the application 305-*d* may dynamically modify the data format 740 of objects requested from the network based on a modem power parameter that is greater than a predetermined threshold. For example, if the application 305-*d* is a browser, the application 305-*d* may request the smaller mobile version of a web page instead of the full version of a web page in response to a higher cost of modem power parameter. Additionally or alternatively, the application 305-*d* may reduce or suspend background update downloads 745 based on a determination that the cost of modem power is greater than a predetermined threshold.

Conversely, the application 305-*d* may increase or reactivate its use of DNS pre-fetches 735, dynamically select a larger data format 740 over the network, and/or increase or reactivate the use of background update downloads 745 based on a determination that the cost of modem power is less than a predetermined threshold. Separate thresholds may be used for separate actions taken by the application 305-*d* based on the cost of modem power parameter.

Figure 8:
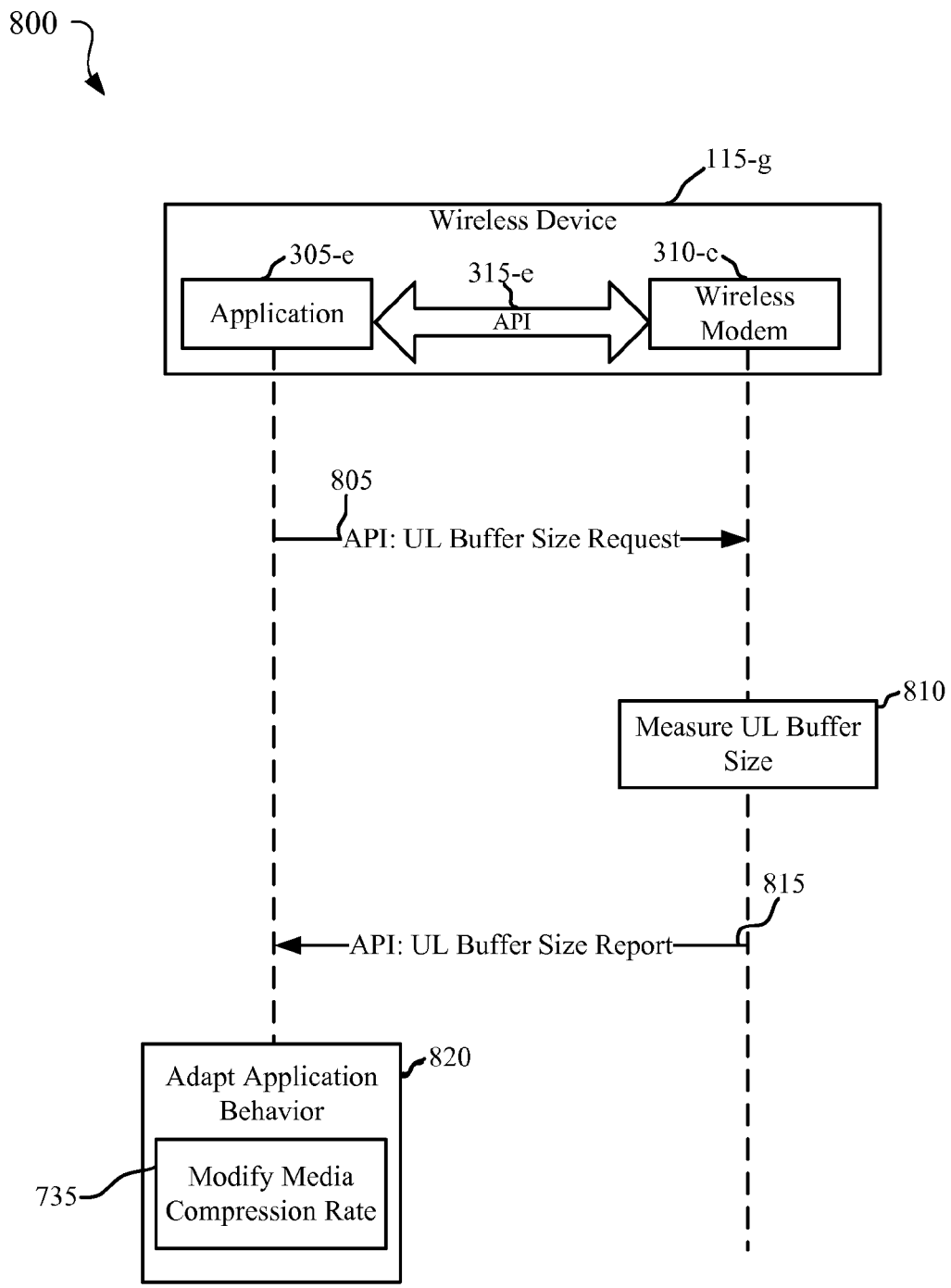
FIG. 8 shows a block diagram of an example of a call flow between an application and a wireless modem of a wireless device according to some embodiments.

FIG. 8 shows a block diagram of an example of a call flow 800 between an application 305-*e* and a wireless modem 310-*e* of a wireless device 115-*g* according to principles described herein. The wireless device 115-*g* may illustrate aspects of one or more of the wireless devices 115 described above with reference to the previous Figures. For example, the wireless device 115-*g* may be a component of one or more of the wireless communications systems 100, 200, 300 described above with reference to the previous Figures. The application 305-*e* and the wireless modem 310-*e* of the wireless device 115-*g* may communicate with each other over an API 315-*e*, as previously discussed.

The call flow 800 of FIG. 8 may illustrate an example of the application 305-*e* using an uplink buffer size parameter received over the API 315-*e* from the wireless modem 310-*e* to adapt the behavior of the application 305-*e* and control wireless communications between the application 305-*e* and a network. The uplink buffer size parameter may be an example of one or more of the physical layer wireless parameters described above with reference to the previous Figures. The uplink buffer size parameter may be available when the wireless modem is in a connected state, and may indicate an amount of data currently waiting to be transmitted over the network by the wireless modem 310-*e*, and may thus serve as one indicator of network congestion, signal quality, and/or uplink data rates.

The process may begin with the application 305-*e* transmitting an uplink buffer size request message 805 to the wireless modem 310-*e* over the API 315-*e*. The uplink buffer size request message 805 may be an example of one or more of the physical layer wireless parameter request messages described above with reference to FIGS. 4-6. At block 810, the wireless modem 310-*e* may receive the uplink buffer size request and determine the uplink buffer size. In the example of a 1x EV-DO system, the uplink buffer may be a reverse link (RL) radio link protocol (RLP) queue. The wireless device 115-*g* may transmit the uplink buffer size to the application 305-*e* over the API 315-*e* in an uplink buffer size report message 815. The uplink buffer size report message 815 may be an example of one or more of the physical layer wireless parameter report messages described above with respect to FIGS. 4-6.

Upon receiving the uplink buffer size report message 815, the application 305-*e* may take one or more steps at block 820 to adapt the application behavior with respect to network communications based on the uplink buffer size. In the example of FIG. 8, the application 305-*e* may be a video chat application that is transmitting streaming video data to the network. Thus, if the uplink buffer size is greater than a predetermined threshold, the application behavior may be adapted at block 825 by increasing a media compression rate (e.g., lowering a video codec rate) of the streaming video data transmitted to the network. Doing so may reduce the size of the streaming video data and help lower the uplink buffer size over time. Conversely, if the uplink buffer size is smaller than a predetermined threshold, the application behavior may be adapted at block 825 by lowering the media compression rate (e.g., raising the video codec rate) of the streaming video data transmitted to the network to improve the quality of the video data.

Figure 9:
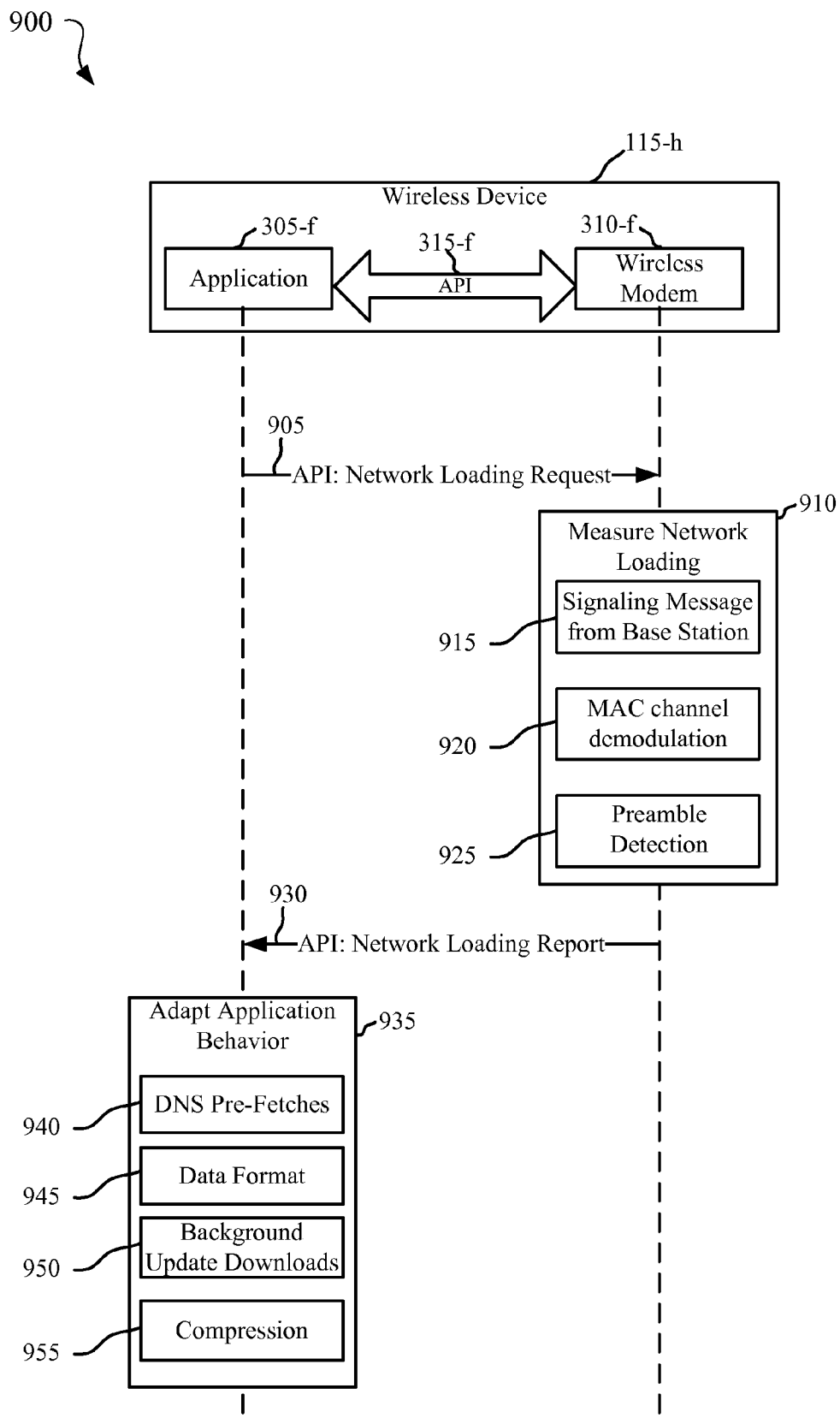
FIG. 9 shows a block diagram of an example of a call flow between an application and a wireless modem of a wireless device according to some embodiments.

FIG. 9 shows a block diagram of an example of a call flow 900 between an application 305-*f* and a wireless modem 310-*f* of a wireless device 115-*h* according to principles described herein. The wireless device 115-*h* may illustrate aspects of one or more of the wireless devices 115 described above with reference to the previous Figures. For example, the wireless device 115-*h* may be a component of one or more of the wireless communications systems 100, 200, 300 described above with reference to the previous Figures. The application 305-*f* and the wireless modem 310-*f* of the wireless device 115-*h* may communicate with each other over an API 315-*f*, as previously discussed.

The call flow 900 of FIG. 9 may illustrate an example of the application 305-*f* using a network loading parameter received over the API 315-*f* from the wireless modem 310-*f* to adapt the behavior of the application 305-*f* and control wireless communications between the application 305-*f* and a network. The network loading parameter may be an example of one or more of the physical layer wireless parameters described above with reference to the previous Figures.

The call flow 900 may begin with the application 305-*f* transmitting a network loading request message 905 to the wireless modem 310-*f* over the API 315-*f*. The network loading request message 905 may be an example of one or more of the physical layer wireless parameter request messages described above with reference to FIGS. 4-6. Upon receiving the network loading request message 905, the wireless modem 310-*f* may measure the network loading at block 910.

The measurement may be accomplished in a number of ways. In certain examples, the wireless modem 310-*f* may measure the network loading based on one or more signaling messages 915 from the base station indicating the network loading as measured at the base station or another network entity. For example, a 1x EV-DO QuickConfig message from the base station may include a set of FTCValid bits indicative of the network congestion. In certain examples, the wireless modem 310-*f* may solicit this message from the base station. Additionally or alternatively the wireless modem 310-*f* may measure the network loading by media access control (MAC) channel demodulation 920. In one example, the wireless modem 310-*f* may detect the MAC channel for all MAC indices at every half-slot to determine the network loading. In another example, the wireless modem 310-*f* may spread the MAC channel detection over multiple half-slots (e.g., detecting a subset of MAC indices for each half-slot) to determine the network loading. Additionally or alternatively, the wireless modem 310-*f* may measure the network loading by preamble detection 925. For example, the wireless modem 310-*f* may detect preambles for all the MAC indices over a time period and count how many users are active in the network.

The wireless modem 310-*f* may transmit the network loading parameter to the application 305-*f* over the API 315-*f* in a network loading report message 930. The uplink data rate report message 1040 may be an example of one or more of the physical layer wireless parameter reports described above with reference to FIGS. 4-6. Upon receiving the network loading report message 930, the application 305-*f* may take one or more steps at block 935 to adapt the application behavior with respect to network communications based on the network loading parameter in the network loading report message 930. In the example of FIG. 9, the application behavior may be adapted by increasing or decreasing the use of DNS pre-fetches 940 based on the network loading parameter, modifying the data format 945 transmitted to or requested from the network based on the network loading parameter, increasing or decreasing the use of background update downloads 950 based on the network loading parameter, and/or increasing or decreasing the compression rate 955 of media streamed to or requested from the network based on the network loading parameter.

Figure 10:
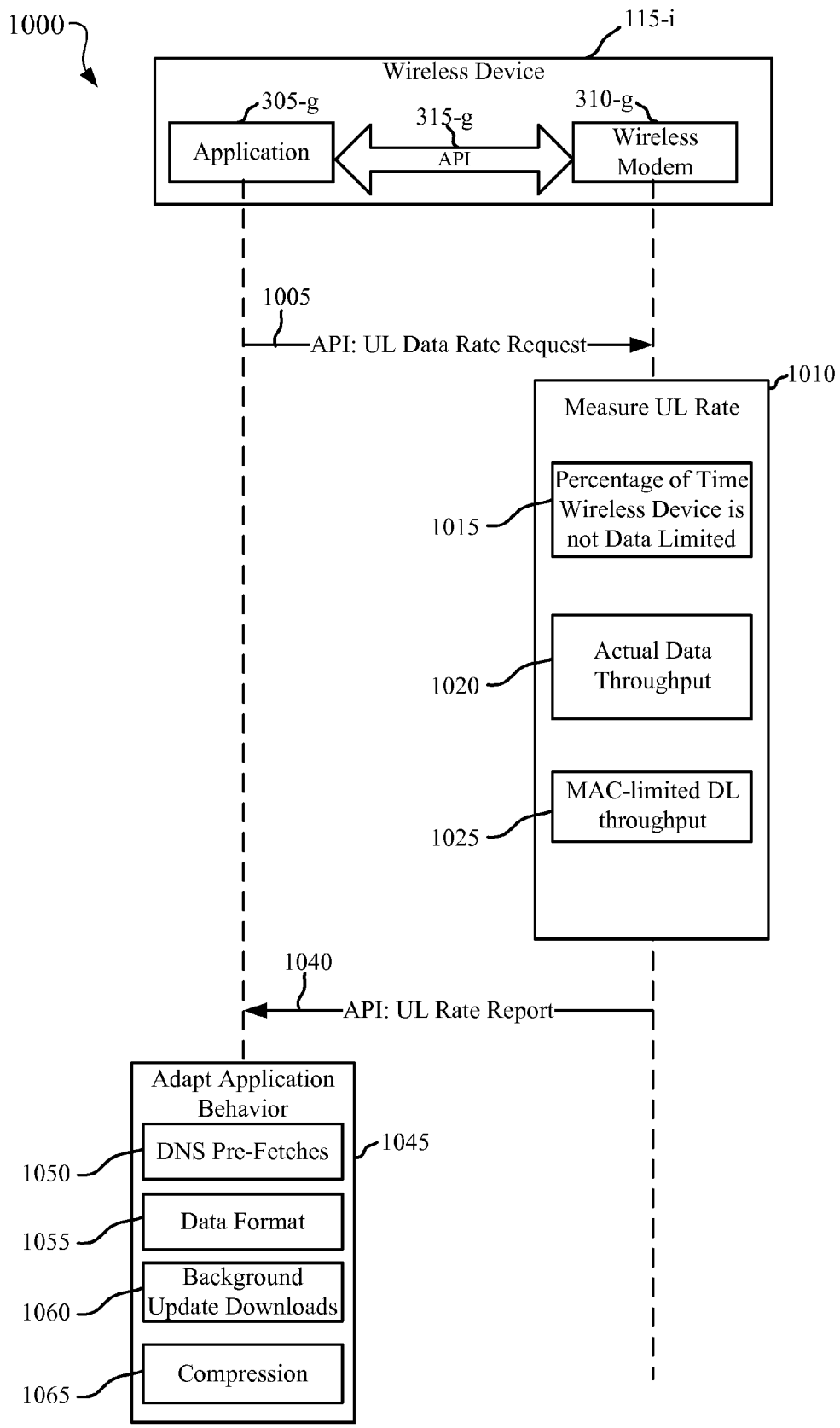
FIG. 10 shows a block diagram of an example of a call flow between an application and a wireless modem of a wireless device according to some embodiments.

FIG. 10 shows a block diagram of an example of a call flow 1000 between an application 305-*g* and a wireless modem 310-*g* of a wireless device 115-*i* according to principles described herein. The wireless device 115-*i* may illustrate aspects of one or more of the wireless devices 115 described above with reference to the previous Figures. For example, the wireless device 115-*i* may be a component of one or more of the wireless communications systems 100, 200, 300 described above with reference to the previous Figures. The application 305-*g* and the wireless modem 310-*g* of the wireless device 115-*i* may communicate with each other over an API 315-*g*, as previously discussed.

The call flow 1000 of FIG. 10 may illustrate an example of the application 305-*g* using a uplink data rate parameter received over the API 315-*f* from the wireless modem 310-*g* to adapt the behavior of the application 305-*g* and control wireless communications between the application 305-*g* and a network. The uplink data rate parameter may be an example of one or more of the physical layer wireless parameters described above with reference to the previous Figures. In certain examples, the uplink data rate parameter may reflect an aggregate uplink data rate available to the wireless modem 310-*h* over multiple carriers and/or RATs.

The call flow 1000 may begin with the application 305-*g* transmitting an uplink data rate request message 1005 to the wireless modem 310-*g* over the API 315-*g*. The uplink data rate request message 1005 may be an example of one or more of the physical layer wireless parameter request messages described above with reference to FIGS. 4-6. Upon receiving the uplink data rate request message 1005, the wireless modem 310-g may measure the uplink data rate of the wireless modem 310-h at block 1010.

The measurement may be accomplished in a number of ways. In certain examples, the wireless modem 310-g may measure the uplink data rate parameter based on the percentage 1015 of time the wireless device 115-i is not data limited. Additionally or alternatively, the wireless modem 310-g may measure the uplink data rate parameter based on an actual data uplink throughput 1020 of the wireless modem 310-g. Additionally or alternatively, the wireless modem 310-g may measure the uplink data rate parameter based on MAC-limited uplink throughput 1025. Additionally or alternatively, the wireless modem 310-g may measure the uplink data rate parameter based on a percentage 1030 of wireless devices utilized or served in the network or on a network loading parameter 1035 determined for the network.

The wireless modem 310-g may transmit the uplink data rate parameter to the application 305-g over the API 315-g in an uplink data rate report message 1040. The uplink data rate report message 1040 may be an example of one or more of the physical layer wireless parameter reports described above with reference to FIGS. 4-6. Upon receiving the uplink data rate report message 1040, the application 305-g may take one or more steps at block 1045 to adapt the application behavior with respect to network communications based on the uplink data rate parameter in the uplink data rate report message 1040. In the example of FIG. 10, the application behavior may be adapted by increasing or decreasing the use of DNS prefetches 1050 based on the uplink data rate parameter, modifying the data format 1055 transmitted to or requested from the network based on the uplink data rate parameter, increasing or decreasing the use of background update downloads 1060 based on the uplink data rate parameter, and/or increasing or decreasing the compression rate 1065 of media streamed to or requested from the network based on the uplink data rate parameter.

Figure 11:
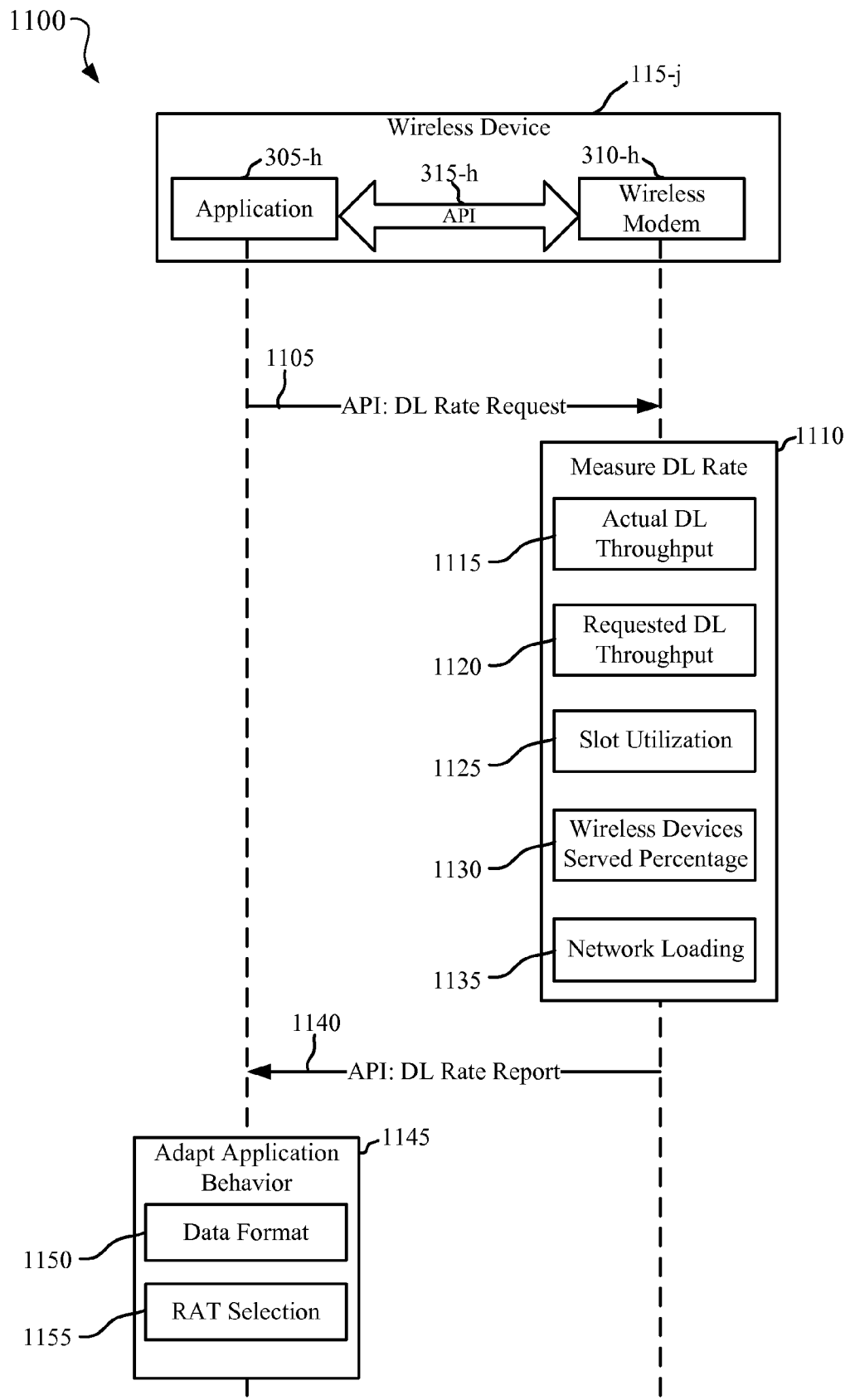
FIG. 11 shows a block diagram of an example of a call flow between an application and a wireless modem of a wireless device according to some embodiments.

FIG. 11 shows a block diagram of an example of a call flow 1100 between an application 305-h and a wireless modem 310-h of a wireless device 115-j according to principles described herein. The wireless device 115-j may illustrate aspects of one or more of the wireless devices 115 described above with reference to the previous Figures. For example, the wireless device 115-j may be a component of one or more of the wireless communications systems 100, 200, 300 described above with reference to the previous Figures. The application 305-h and the wireless modem 310-h of the wireless device 115-j may communicate with each other over an API 315-h, as previously discussed.

The call flow 1100 of FIG. 11 may illustrate an example of the application 305-h using a downlink data rate parameter received over the API 315-h from the wireless modem 310-h to adapt the behavior of the application 305-h and control wireless communications between the application 305-h and a network. The downlink data rate parameter may be an example of one or more of the physical layer wireless parameters described above with reference to the previous Figures. In certain examples, the downlink data rate parameter may reflect an aggregate downlink data rate available to the wireless modem 310-h over multiple carriers and/or RATs.

The call flow 1100 may begin with the application 305-h transmitting a downlink data rate request message 1105 to the wireless modem 310-h over the API 315-h. The downlink data rate request message 1105 may be an example of one or more of the physical layer wireless parameter request messages described above with reference to FIGS. 4-6. Upon receiving the downlink data rate request message 1105, the wireless modem 310-h may measure the downlink data rate of the wireless modem 310-h at block 1110.

The measurement may be accomplished in a number of ways. In certain examples, the wireless modem 310-h may measure the downlink data rate parameter based on an actual downlink throughput 1115 of the wireless modem 310-h. Additionally or alternatively, the wireless modem 310-h may measure the downlink data rate parameter based on a requested downlink data rate 1120 for the wireless modem 310-h. Additionally or alternatively, the wireless modem 310-h may measure the downlink data rate parameter based on slot or other resource utilization 1125 for the wireless modem 310-h. Additionally or alternatively, the wireless modem 310-h may measure the downlink data rate parameter based on a percentage 1130 of wireless devices utilized or served in the network or on a network loading parameter 1135 determined for the network.

The wireless modem 310-h may transmit the downlink data rate parameter to the application 305-h over the API 315-h in a downlink data rate report message 1140. The downlink data rate report message 1140 may be an example of one or more of the physical layer wireless parameter reports described above with reference to FIGS. 4-6. Upon receiving the downlink data rate report message 1140, the application 305-h may take one or more steps at block 1145 to adapt the application behavior with respect to network communications based on the downlink data rate parameter in the downlink data rate report message 1140. In the example of FIG. 11, the application behavior may be adapted by modifying the data format 1150 requested from the network based on the uplink data rate parameter (e.g., requesting mobile versions of web pages if the downlink data rate is below a predetermined threshold or requesting full versions of web pages if the downlink data rate is above a predetermined threshold) and/or performing RAT selection 1155 to switch downlink communications to a new RAT (e.g., switch from WWAN to WLAN if the downlink data rate is below a predetermined threshold).

Figure 12:
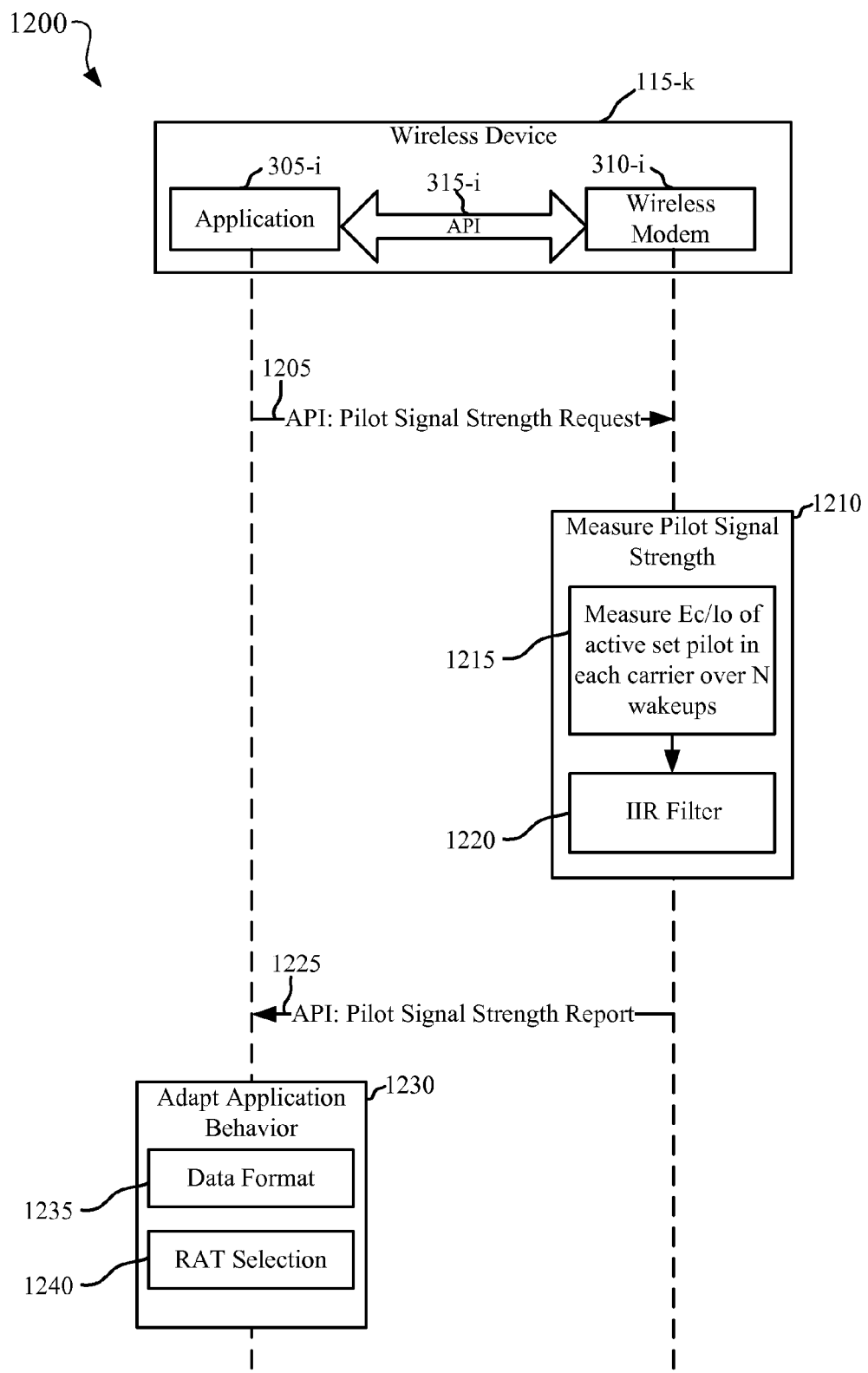
FIG. 12 shows a block diagram of an example of a call flow between an application and a wireless modem of a wireless device according to some embodiments.

FIG. 12 shows a block diagram of an example of a call flow 1200 between an application 305-i and a wireless modem 310-i of a wireless device 115-k according to principles described herein. The wireless device 115-k may illustrate aspects of one or more of the wireless devices 115 described above with reference to the previous Figures. For example, the wireless device 115-k may be a component of one or more of the wireless communications systems 100, 200, 300 described above with reference to the previous Figures. The application 305-i and the wireless modem 310-i of the wireless device 115-k may communicate with each other over an API 315-i, as previously discussed.

The call flow 1200 of FIG. 12 may illustrate an example of the application 305-i using a pilot signal strength parameter received over the API 315-i from the wireless modem 310-i to adapt the behavior of the application 305-i and control wireless communications between the application 305-i and a network. The pilot signal strength parameter may be an example of one or more of the physical layer wireless parameters described above with reference to the previous Figures. In certain examples, the pilot signal strength parameter may reflect an aggregate or average signal strength available to the wireless modem 310-i over multiple carriers and/or RATs. Alternatively, the wireless modem 310-i may select one carrier and/or RAT on which to base the pilot signal strength parameter.

The call flow 1200 may begin with the application 305-i transmitting a pilot signal strength request message 1205 to the wireless modem 310-*i* over the API 315-*i*. The pilot signal strength request message 1205 may be an example of one or more of the physical layer wireless parameter request messages described above with reference to FIGS. 4-6. Upon receiving the pilot signal strength request message 1205, the wireless modem 310-*i* may measure the downlink pilot signal strength of the wireless modem 310-*i* at block 1210.

In the example of FIG. 12, the pilot signal strength parameter may be calculated by measuring (block 1215) the Ec/Io of the active set pilot signal for each carrier over a number (N) of wakeups, then passing the measured pilot signal strengths for the N wakeups through an infinite impulse response (IIR) filter 1220.

The wireless modem 310-*i* may transmit the pilot signal strength parameter to the application 305-*i* over the API 315-*i* in a pilot signal strength report message 1225. The pilot signal strength report message 1225 may be an example of one or more of the physical layer wireless parameter reports described above with reference to FIGS. 4-6. Upon receiving the pilot signal strength report message 1225, the application 305-*i* may take one or more steps at block 1230 to adapt the application behavior with respect to network communications based on the pilot signal strength parameter in the pilot signal strength report message 1225. In the example of FIG. 12, the application behavior may be adapted by modifying the data format 1235 requested from the network based on the uplink data rate parameter (e.g., requesting mobile versions of web pages if the pilot signal strength parameter is below a predetermined threshold or requesting full versions of web pages if the pilot signal strength parameter is above a predetermined threshold) and/or performing RAT selection 1240 to switch downlink communications to a new RAT (e.g., switch from WWAN to WLAN if the downlink data rate is below a predetermined threshold).

Figure 13:
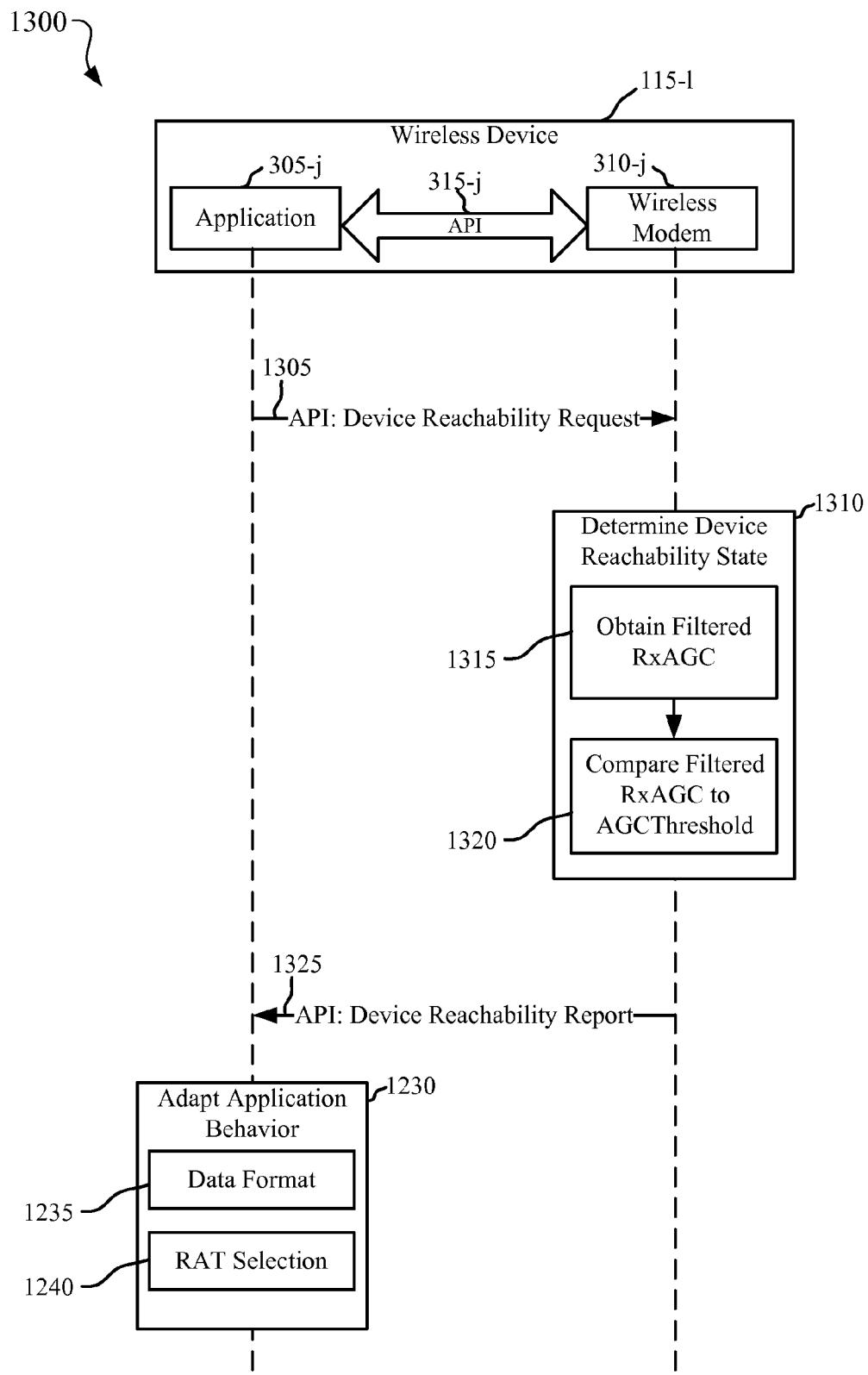
FIG. 13 shows a block diagram of an example of a call flow between an application and a wireless modem of a wireless device according to some embodiments.

FIG. 13 shows a block diagram of an example of a call flow 1300 between an application 305-*j* and a wireless modem 310-*j* of a wireless device 115-1 according to principles described herein. The wireless device 115-1 may illustrate aspects of one or more of the wireless devices 115 described above with reference to the previous Figures. For example, the wireless device 115-1 may be a component of one or more of the wireless communications systems 100, 200, 300 described above with reference to the previous Figures. The application 305-*j* and the wireless modem 310-*j* of the wireless device 115-1 may communicate with each other over an API 315-*j*, as previously discussed.

The call flow 1300 of FIG. 13 may illustrate an example of the application 305-*j* using a device reachability parameter received over the API 315-*j* from the wireless modem 310-*j* to adapt the behavior of the application 305-*j* and control wireless communications between the application 305-*j* and a network. The device reachability parameter may be an example of one or more of the physical layer wireless parameters described above with reference to the previous Figures. In certain examples, the device reachability parameter may indicate the degree to which the wireless device is reachable by the network, which may affect the frequency with which the application 305-*j* sends presence information over the air link with the network.

In one example, the device reachability parameter may be selected from one of four discrete device reachability parameters, defined as 0x00, 0x01, 0x10, and 0x11. Device reachability parameter 0x00 may indicate that the wireless device 115-1 has good coverage and that there is no need for the application 305-*j* to send periodic presence updates to the server, or that the periodic presence updates may be sent less frequently. Device reachability parameter 0x01 may indicate that the wireless device 115-1 has weak coverage and that the application 305-*j* may send periodic presence updates to a server according to a predetermined schedule. Device reachability parameter 0x10 may indicate that the wireless device 115-1 has just woken up, which may trigger the application 305-*j* to update a server of its change in status (e.g., let the server know that the application 305-*j* is available for communication with the server). Following this one-time update, the wireless device 115-1 may transition to reachability state 0x00 or 0x01. Device reachability parameter 0x11 may indicate that the wireless device 115-1 is about powering down, which may trigger the application 305-*j* to update a server of its change in status (e.g., let the server know that the application 305-*j* is unavailable until further notice). To allow time for this update, the power down of the wireless device 115-1 may be delayed by a configurable amount of time.

The call flow 1300 of FIG. 13 may begin with the application 305-*j* transmitting a device reachability request message 1305 to the wireless modem 310-*j* over the API 315-*j*. The device reachability request message 1305 may be an example of one or more of the physical layer wireless parameter request messages described above with reference to FIGS. 4-6. Upon receiving the device reachability request message 1305, the wireless modem 310-*j* may determine the device reachability parameter at block 1310.

Continuing with the example of four discrete device reachability parameters, if the wireless modem 310-*j* has just woken up, the device reachability parameter may be set to 0x10. Similarly, if the wireless modem 310-*j* is about to power down, the device reachability parameter may be set to 0x11. If the wireless modem 310-*j* is in a connected or idle state, the device reachability parameter may be determined by obtaining (block 1315) a filtered version of a current receive side automatic gain control (filteredRxAGC). When the wireless modem 310-*j* is in an idle state, the value of filtered RxAGC may be reset each time the wireless modem 310-*j* wakes up. The wireless modem 310-*j* may compare (block 1320) the filteredRxAGC value to a predetermined threshold (AGCThreshold) at block 1320 to compute the device reachability parameter. In one example, AGCThreshold may be equal to about −90 dBm. If a maximum value of filteredRxAGC is less than AGCThreshold, the device reachability parameter may be set to 0x01, and if the maximum value of filteredRxAGC is greater than AGCThreshold, the device reachability parameter may be set to 0x00. Block 1315 and block 1320 may be performed periodically (e.g., at the end of every slot) when the wireless modem 310-*j* is in a connected state or at every wakeup when the wireless modem 310-*j* is in an idle state.

The wireless modem 310-*j* may transmit the device reachability parameter to the application 305-*j* over the API 315-*j* in a device reachability report message 1325. The device reachability report message 1325 may be an example of one or more of the physical layer wireless parameter reports described above with reference to FIGS. 4-6. Upon receiving the device reachability report message 1325, the application 305-*j* may take one or more steps at block 1330 to adapt the application behavior with respect to network communications based on the pilot signal strength parameter in the device reachability report message 1325. In the example of FIG. 13, the application behavior may be adapted by modifying a frequency with which the application 305-*j* transmits presence updates to a server based on the device reachability parameter. For example, if the device reachability parameter is 0x00, the application 305-*j* may reduce the frequency of presence updates, thereby reducing network congestion and conserving resources at the wireless device 115-1.

Figure 14:
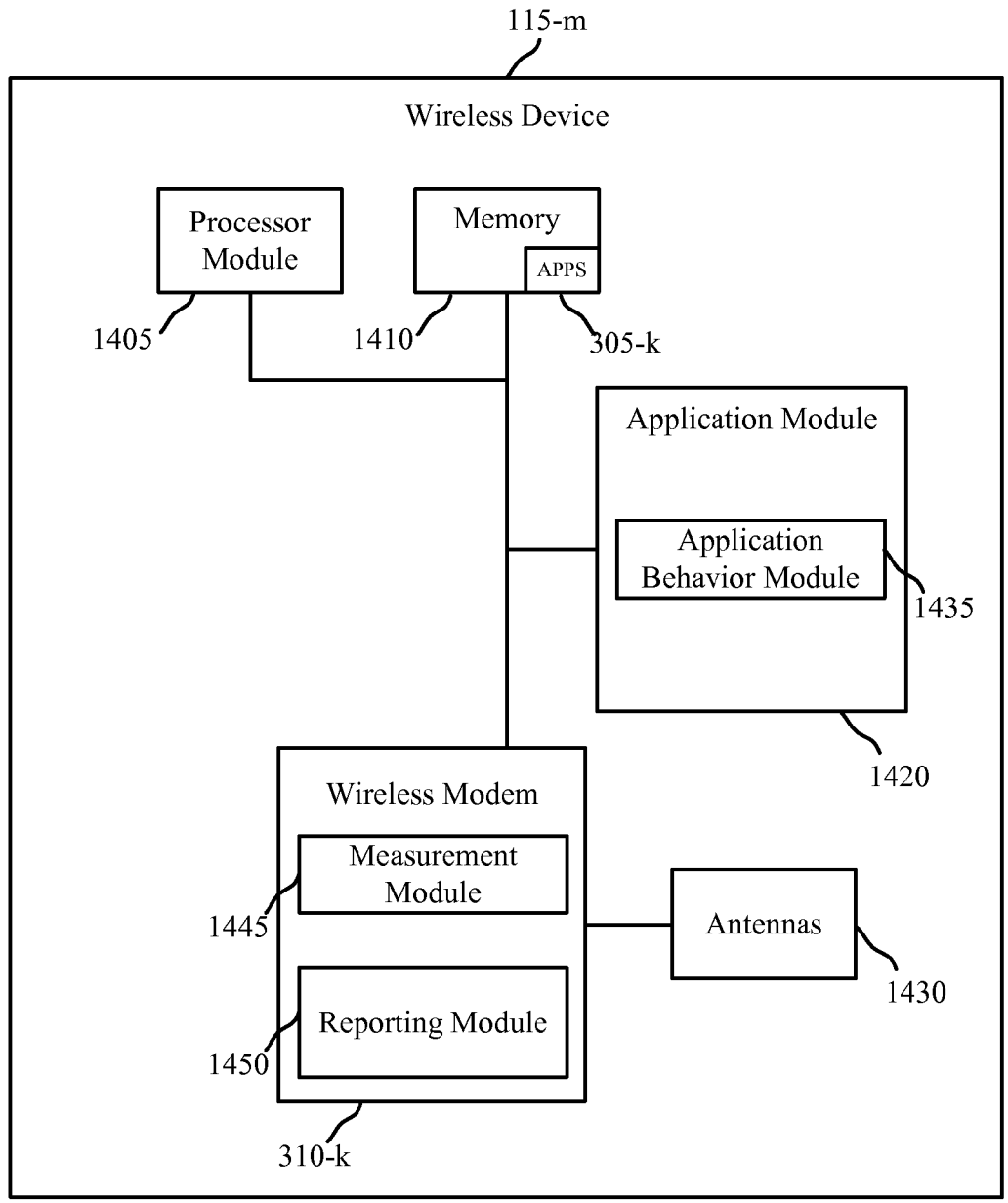
FIG. 14 shows a block diagram of an example of a wireless device according to some embodiments.

FIG. 14 shows a block diagram of an example of a wireless device 115-m according to principles described herein. The wireless device 115-m may be an example of one or more of the wireless devices 115 described above with reference to the previous Figures.

The wireless device 115-m may include a processor 1405, a memory 1410, an application module 1420, a wireless modem 310-k, and antennas 1430. Each of these components may be in communication, directly or indirectly.

The processor 1405 may be configured to execute computer-readable program code stored by the memory 1410 to execute one or more applications 305-k. The functional aspects of the processor 1405 executing the one or more applications 305-k are illustrated as the application module 1420. In certain examples, the processor 1405 may implement one or more aspects of the wireless modem 310-k. Additionally or alternatively, the wireless modem 310-k may include a separate processor (not shown). The application(s) 305-k of the application module 1420 and the wireless modem 310-k may communicate over an application programming interface (API). In certain examples, the API may be implemented by or as a QMI system or another interface.

The wireless modem 310-k may include a measurement module 1445 configured to measure at least one physical layer wireless parameter associated with a physical interface (e.g., an air interface) between the wireless modem 310-k and a network. The wireless modem 310-k may also include a reporting module 1450 configured to report the measured at least one physical layer wireless parameter to the application module 1420 over the API. The application module 1420 may include an application behavior module 1435 configured to adapt a behavior of the application module 1420 to control wireless communications between the application module 1420 and the network based on the at least one physical layer wireless parameter reported over the API by the reporting module 1450.

In certain examples, the wireless modem may run a server and the application module may run a client. The server and the client may communicate with each other. In certain examples, the server component of the wireless modem 310-k may receive a request from the client component of the application module 1420 over the API. The request may identify the at least one physical layer wireless parameter. The measurement of the at least one physical layer wireless parameter at the measurement module 1445 may be triggered by the request, and the reporting module 1450 may transmit the at least one physical layer wireless parameter over the API to the application module 1420 in response to the request.

In certain examples, the wireless modem 310-k may receive at least one standing request for the at least one physical layer wireless parameter from the application module 1420 over the API. The reporting module 1450 of the wireless modem 310-k may report, at each of a plurality of periodic reporting intervals while the wireless modem 310-k is in a connected state, the at least one physical layer wireless parameter to the application module 1420 based on the standing request.

In certain examples, the reporting module 1450 of the wireless modem 310-k may report the at least one physical layer wireless parameter to the application module 1420 over the API during each of a plurality of scheduled wakeups while the wireless modem 310-k is in an idle state. In certain examples, the reporting module 1450 may report a different set of physical layer wireless parameters to the application during the idle state of the wireless modem 310-k than during the connected state of the wireless modem.

In certain examples, the wireless modem 310-k may classify the at least one physical layer wireless parameter into one of a plurality of predetermined categories (e.g., low, medium, high). The reporting module 1450 may report the at least one physical layer wireless parameter by transmitting the predetermined category to the application over the API.

In certain examples, the at least one physical layer wireless parameter may include one or more of: a cost of modem power associated with transmitting data from the wireless modem, an uplink data rate, a downlink data rate, a network loading parameter, a maximum multimedia rate (e.g., a maximum video codec rate), an uplink buffer size of the wireless modem, or a pilot signal strength.

In certain examples, the application behavior module 1435 may adapt the behavior of the application module 1420 by dynamically modifying a usage of Domain Name Server (DNS) prefetches by the wireless device 115-m. Additionally or alternatively, the application behavior module 1435 may adapt the behavior of the application module 1420 by dynamically modifying a format of data requested by the application module 1420 from the network. Additionally or alternatively, the application behavior module 1435 may adapt the behavior of the application module 1420 by dynamically modifying a download of a background update for the application module 1420. Additionally or alternatively, the application behavior module 1435 may adapt the behavior of the application module 1420 by dynamically modifying a compression used to stream data between the application module 1420 and the network. Additionally or alternatively, the application behavior module 1435 may adapt the behavior of the application module 1420 by dynamically selecting a radio access technology used for the wireless communications between the application module 1420 and the network.

In certain examples, the reporting module 1450 may additionally report a battery status of the wireless device 115-m to the application module 1420 over the API in connection with the at least one physical layer wireless parameter. The application behavior module 1435 may adapt the behavior of the application module 1420 further based on the battery status of the wireless device 115-m.

Figure 15:
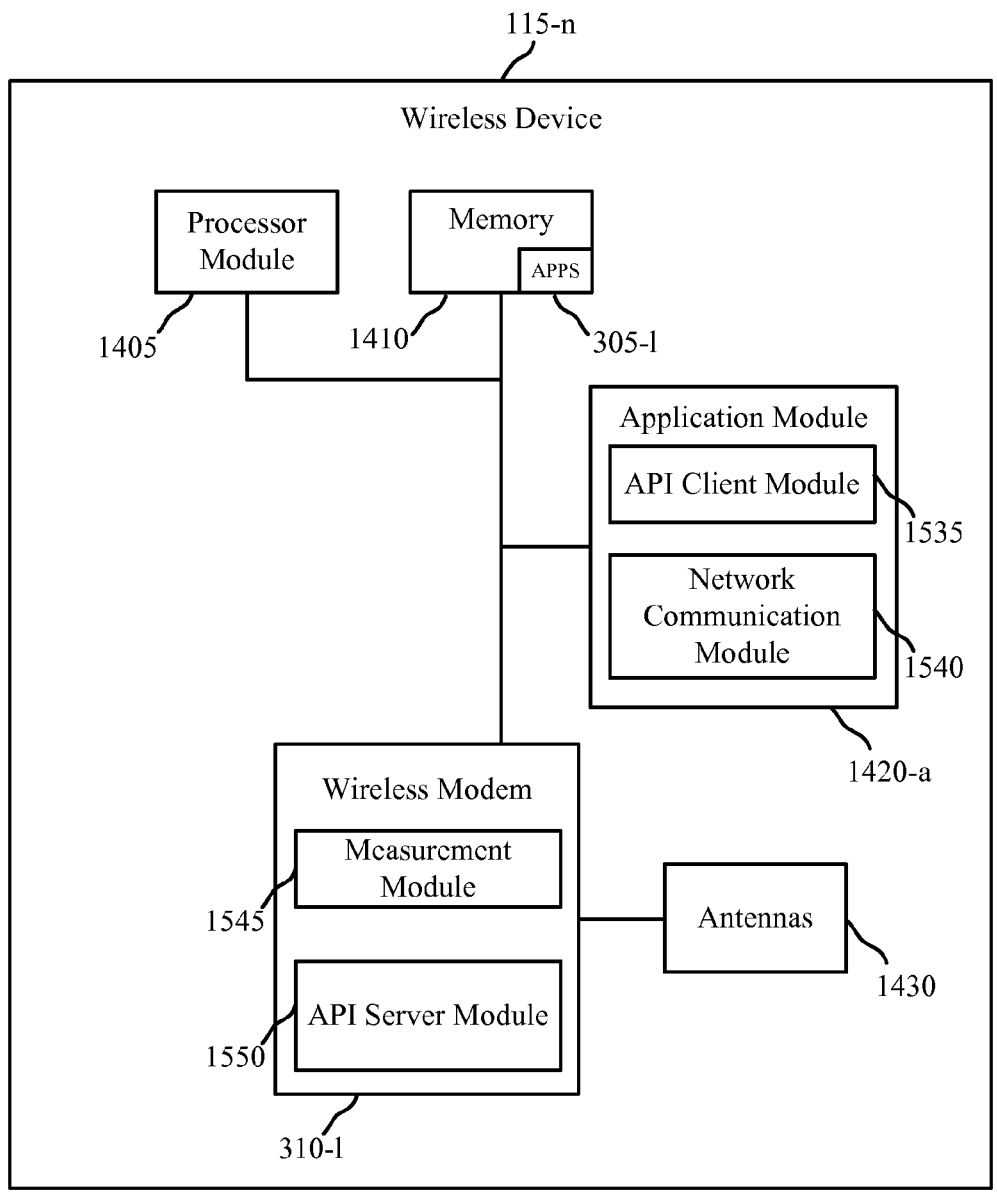
FIG. 15 shows a block diagram of an example of a wireless device according to some embodiments.

FIG. 15 shows a block diagram of an example of a wireless device 115-n according to principles described herein. The wireless device 115-n may be an example of one or more of the wireless devices 115 described above with reference to the previous Figures.

The wireless device 115-n may include a processor 1405, a memory 1410, an application module 1420-a, a wireless modem 310-1, and antennas 1430. Each of these components may be in communication, directly or indirectly.

The processor 1405 may be configured to execute computer-readable program code stored by the memory 1410 to execute one or more applications 305-1 which may encompass the functionality of the application module 1420-a. In certain examples, the processor 1405 may implement one or more aspects of the wireless modem 310-1. Additionally or alternatively, the wireless modem 310-1 may include a separate processor (not shown). The application module 1420-a and the wireless modem 310-1 may communicate over an application programming interface (API). The application module 1420-a may include an API client module 1535 configured to communicate with an API server module 1550 of the wireless modem 310-1 to implement the API. In certain examples, the API may be implemented by or as a QMI system or another interface.

The API client module 1535 of the application module 1420-a may be configured to request at least one physical layer wireless parameter from the API server module 1550 of the wireless modem 310-1 over the API. The at least one physical layer wireless parameter may include information associated with an air interface between the wireless device 115-n and at least one base station (not shown) (e.g., base station 105 of FIG. 1). The measurement module 1545 of the wireless modem 310-1 may measure the requested at least one physical layer wireless parameter, and the API server module 1550 of the wireless modem 310-1 may transmit the requested at least one physical layer wireless parameter to the API client module 1535 over the API.

Upon receiving the at least one physical layer wireless parameter at the API client module 1535, a network communication module 1540 of the application module 1420-a may determine a modification to wireless communications between the application module 1420-a and the network based on the received at least one physical layer wireless parameter. The network communication module 1540 may further communicate with the network using the wireless modem 310-1 according to the determined modification.

In certain examples, the API client module 1535 may be configured to transmit at least one standing request for the at least one physical layer wireless parameter to the API server module 1550 of the wireless modem 310-1 over the API. The API client module 1535 may receive a report of the at least one physical layer wireless parameter from the API server module 1550 of the wireless modem 310-1 over the API at each of a plurality of periodic reporting intervals while the wireless modem is in a connected state. Additionally or alternatively, the API client module 1535 may receive a report of the at least one physical layer wireless parameter from the wireless modem over the application programming interface during each of a plurality of scheduled wakeups while the wireless modem is in an idle state.

In certain examples, the at least one physical layer wireless parameter may include one or more of: a cost of modem power associated with transmitting data from the wireless modem, an uplink data rate, a downlink data rate, a network loading parameter, a maximum multimedia rate (e.g., a maximum video codec rate), an uplink buffer size, or a pilot signal strength.

In certain examples, the modification to wireless communications between the application and the network may include a modification to one or more of: a usage of Domain Name Server (DNS) prefetches by the wireless device 115-n, a format of data requested by the application module 1420-a from the network, a download of a background update for the application module 1420-a, a compression used to stream data between the application module 1420-a and the network, or a radio access technology used for the wireless communications between the application module 1420-a and the network.

In certain examples, the API client module 1535 may receive a battery status of the wireless device 115-n over the application programming interface in connection with the at least one physical layer wireless parameter, and the modification to the wireless communications may be further based on the battery status of the wireless device 115-n.

Figure 16:
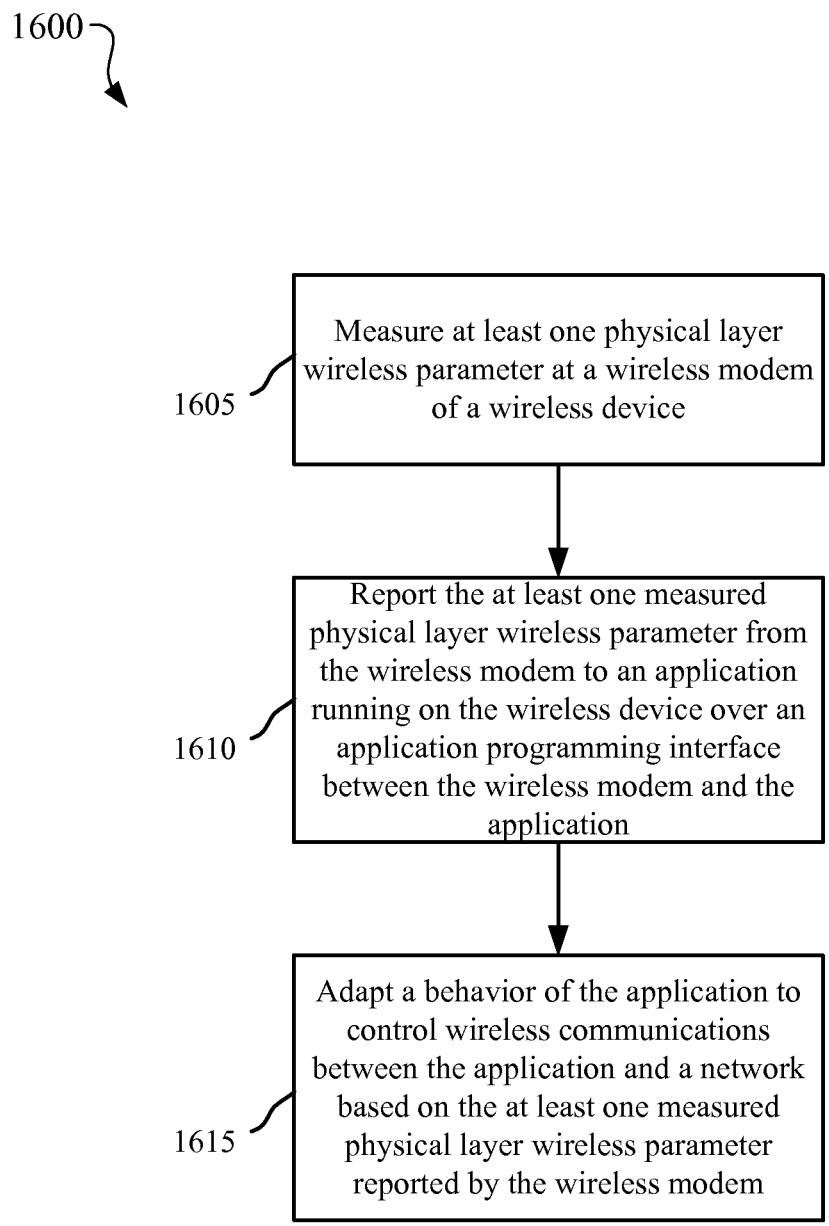
FIG. 16 shows a flowchart diagram of an example of a method for managing a wireless device according to some embodiments.

FIG. 16 shows a flowchart diagram of an example of a method for managing a wireless device according to principles described herein. The method 1600 may be performed by, for example, one or more of the wireless devices 115 described above with respect to the previous Figures.

At block 1605, at least one physical layer wireless parameter may be measured at a wireless modem of a wireless device. At block 1610, the at least one measured physical layer wireless parameter may be reported from the wireless modem to an application running on the wireless device over an application programming interface (API) between the wireless modem and the application. At block 1615, a behavior of the application may be adapted to control wireless communications between the application and a network based on the at least one measured physical layer wireless parameter reported by the wireless modem.

Figure 17:
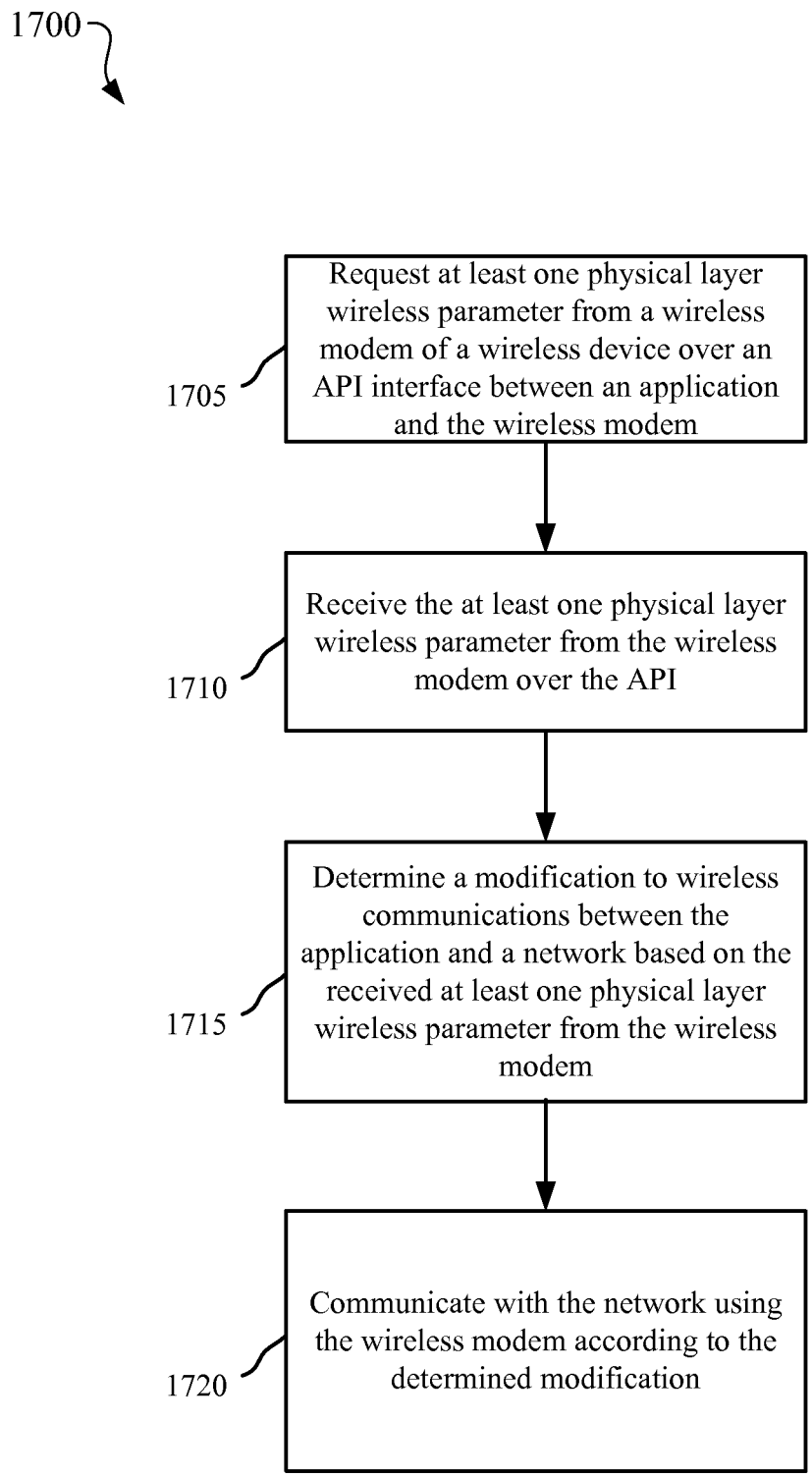
FIG. 17 shows a flowchart diagram of an example of a method for managing a wireless device according to some embodiments.

FIG. 17 shows a flowchart diagram of an example of a method for managing a wireless device according to principles described herein. The method 1700 may be performed by, for example, one or more of the wireless devices 115 described above with respect to the previous Figures.

At block 1705, at least one physical layer wireless parameter may be requested from a wireless modem of a wireless device over an API interface between an application and the wireless modem. The at least one physical layer wireless parameter may include information associated with an air interface between the wireless device and at least one base station. At block 1710, the at least one physical layer wireless parameter may be received from the wireless modem over the API. At block 1715, a modification to wireless communications between the application and a network may be determined based on the received at least one physical layer wireless parameter from the wireless modem. At block 1720, communication with the network may occur with the wireless network using the wireless modem according to the determined modification.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of managing a wireless device, comprising:
   receiving, at a server running on a wireless modem of a wireless device, at least one standing request from a client component of an application running on the wireless device over an application programming interface between the wireless modem and the application, the at least one standing request identifying at least one physical layer wireless parameter, the at least one physical layer wireless parameter comprising one or more of a cost of modem power associated with transmitting data from the wireless modem, an uplink data rate, a downlink data rate, a network loading parameter, a maximum multimedia rate, an uplink buffer size of the wireless modem, a pilot signal strength, or a device reachability;
   determining the at least one physical layer wireless parameter at the wireless modem;
   reporting the at least one physical layer wireless parameter from the wireless modem to the application over the application programming interface between the wireless modem and the application at each of a plurality of periodic reporting intervals while the wireless modem is in a connected state in response to the at least one standing request; and
   adapting a behavior of the application to control wireless communications between the application and a network based on the at least one physical layer wireless parameter reported by the wireless modem, wherein the adapting the behavior of the application comprises one or more of: dynamically modifying a usage of Domain Name Server (DNS) prefetches by the wireless device, dynamically modifying a download of a background update for the application, or dynamically modifying a compression used to stream data between the application and the network.

2. The method of claim 1, further comprising:
   mapping the at least one physical layer wireless parameter into one of a plurality of predetermined categories, the plurality of predetermined categories comprising a classification of a magnitude of the at least one physical layer wireless parameter;
   wherein the reporting comprises transmitting the predetermined category to the application over the application programming interface.

3. The method of claim 1, wherein the adapting the behavior of the application further comprises: dynamically modifying a format of data requested by the application from the network.

4. The method of claim 1, wherein the adapting the behavior of the application further comprises: dynamically selecting a radio access technology used for the wireless communications between the application and the network.

5. A wireless device, comprising:
   at least one processor; and
   a memory coupled with the at least one processor, wherein the at least one processor is configured to execute an application stored on the memory to:
   receive, at a server running on a wireless modem of a wireless device, at least one standing request from a client component of an application running on the wireless device over an application programming interface between the wireless modem and the application, the at least one request identifying at least one physical layer wireless parameter, the at least one physical layer wireless parameter comprising one or more of a cost of modem power associated with transmitting data from the wireless modem, an uplink data rate, a downlink data rate, a network loading parameter, a maximum multimedia rate, an uplink buffer size of the wireless modem, a pilot signal strength, or a device reachability;
   determine the at least one physical layer wireless parameter at the wireless modem;
   report the at least one physical layer wireless parameter from the wireless modem to the application over the application programming interface between the wireless modem and the application at each of a plurality of periodic reporting intervals while the wireless modem is in a connected state in response to the at least one standing request; and
   adapt a behavior of the application to control wireless communications between the application and a network based on the at least one physical layer wireless parameter reported by the wireless modem, wherein the adapting the behavior of the application comprises one or more of: dynamically modifying a usage of Domain Name Server (DNS) prefetches by the wireless device, dynamically modifying a download of a background update for the application, or dynamically modifying a compression used to stream data between the application and the network.

6. The wireless device of claim 5, wherein the at least one processor is configured to adapt the behavior of the application by additionally adapting one or more of: a format of data requested by the application from the network, or a radio access technology used for the wireless communications between the application and the network.

7. A method of managing a wireless device, comprising:
transmitting, from a client component of an application running on a wireless device, at least one standing request to a server running on a wireless modem of the wireless device over an application programming interface between the wireless modem and the application, the at least one standing request identifying at least one physical layer wireless parameter, the at least one physical layer wireless parameter comprising one or more of a cost of modem power associated with transmitting data from the wireless modem, an uplink data rate, a downlink data rate, a network loading parameter, a maximum multimedia rate, an uplink buffer size of the wireless modem, a pilot signal strength, or a device reachability;
determining the at least one physical layer wireless parameter at the wireless modem;
receiving the at least one physical layer wireless parameter from the wireless modem over the application programming interface between the wireless modem and the application at each of a plurality of periodic reporting intervals while the wireless modem is in a connected state in response to the at least one standing request;
determining a modification to wireless communications between the application and a network based on the received at least one physical layer wireless parameter from the wireless modem, wherein the modification comprises one or more of: dynamically modifying a usage of Domain Name Server (DNS) prefetches by the wireless device, dynamically modifying a download of a background update for the application, or dynamically modifying a compression used to stream data between the application and the network; and
communicating with the network using the wireless modem according to the determined modification.

8. The method of claim 7, wherein the modification to wireless communications between the application and the network additionally comprises a modification to one or more of: a format of data requested by the application from the network, or a radio access technology used for the wireless communications between the application and the network.

9. The wireless device of claim 7, wherein the modification to wireless communications between the application and the network additionally comprises a modification to one or more of: a format of data requested by the application from the network, or a radio access technology used for the wireless communications between the application and the network.

10. A wireless device, comprising:
at least one processor; and
a memory communicatively coupled with the at least one processor, wherein the at least one processor is configured to execute an application stored on the memory to:
transmit, from a client component of an application running on a wireless device, at least one standing request to a server running on a wireless modem of the wireless device over an application programming interface between the wireless modem and the application, the at least one standing request identifying at least one physical layer wireless parameter, the at least one physical layer wireless parameter comprising one or more of a cost of modem power associated with transmitting data from the wireless modem, an uplink data rate, a downlink data rate, a network loading parameter, a maximum multimedia rate, an uplink buffer size of the wireless modem, a pilot signal strength, or a device reachability;
determine the at least one physical layer wireless parameter at the wireless modem;
receive the at least one physical layer wireless parameter from the wireless modem over the application programming interface between the wireless modem and the application at each of a plurality of periodic reporting intervals while the wireless modem is in a connected state in response to the at least one standing request;
determine a modification to wireless communications between the application and a network based on the received air link information from the wireless modem, wherein the modification comprises one or more of: dynamically modifying a usage of Domain Name Server (DNS) prefetches by the wireless device, dynamically modifying a download of a background update for the application, or dynamically modifying a compression used to stream data between the application and the network; and
communicate with the network using the wireless modem according to the determined modification.

11. A method of managing a wireless device, comprising:
receiving, at a server running on a wireless modem of a wireless device, at least one standing request from a client component of an application running on the wireless device over an application programming interface between the wireless modem and the application, the at least one standing request identifying at least one physical layer wireless parameter, the at least one physical layer wireless parameter comprising one or more of a cost of modem power associated with transmitting data from the wireless modem, an uplink data rate, a downlink data rate, a network loading parameter, a maximum multimedia rate, an uplink buffer size of the wireless modem, a pilot signal strength, or a device reachability;
determining the at least one physical layer wireless parameter at the wireless modem;
reporting the at least one physical layer wireless parameter from the wireless modem to the application over the application programming interface between the wireless modem and the application at each of a plurality of periodic reporting intervals while the wireless modem is in a connected state in response to the at least one standing request; and
adapting a behavior of the application to control wireless communications between the application and a network based on the at least one physical layer wireless parameter reported by the wireless modem; and
reporting a battery status of the wireless device to the application over the application programming interface in connection with the at least one physical layer wireless parameter; wherein the adapting the behavior of the application is further based on the battery status of the wireless device.

12. A method of managing a wireless device, comprising:
transmitting, from a client component of an application running on a wireless device, at least one standing request to a server running on a wireless modem of the wireless device over an application programming interface between the wireless modem and the application, the at least one standing request identifying at least one physical layer wireless parameter, the at least one physical layer wireless parameter comprising one or more of a cost of modem power associated with transmitting data from the wireless modem, an uplink data rate, a downlink data rate, a network loading parameter, a maximum multimedia rate, an uplink buffer size of the wireless modem, a pilot signal strength, or a device reachability;
determining the at least one physical layer wireless parameter at the wireless modem;
receiving the at least one physical layer wireless parameter from the wireless modem over the application programming interface between the wireless modem and the application at each of a plurality of periodic reporting intervals while the wireless modem is in a connected state in response to the at least one standing request;
determining a modification to wireless communications between the application and a network based on the received at least one physical layer wireless parameter from the wireless modem;
reporting a battery status of the wireless device to the application over the application programming interface in connection with the at least one physical layer wireless parameter; wherein the determined modification is further based on the battery status of the wireless device; and
communicating with the network using the wireless modem according to the determined modification.

* * * * *